United States Patent [19]
Chandler

[11] Patent Number: 5,394,838
[45] Date of Patent: Mar. 7, 1995

[54] VAPORIZED FUEL INJECTION SYSTEM

[75] Inventor: Charles L. Chandler, Morgantown, W. Va.

[73] Assignee: American Fuel Systems, Inc., Morgantown, W. Va.

[21] Appl. No.: 917,938

[22] Filed: Jul. 24, 1992

[51] Int. Cl.$^6$ .................. F02B 47/00; F02P 11/00
[52] U.S. Cl. .................. 123/25 C; 123/25 K; 123/198 DC; 123/546; 123/630
[58] Field of Search .......... 123/25 C, 41.49, 198 D, 123/198 DC, 546, 25 K, 625, 630

[56] References Cited

U.S. PATENT DOCUMENTS

| | | | |
|---|---|---|---|
| 2,809,224 | 10/1957 | Bowes | 123/630 |
| 3,074,228 | 1/1963 | Lee | 123/25 C |
| 3,105,480 | 10/1963 | Farris | 123/630 |
| 3,872,316 | 3/1975 | Kurii et al. | 123/198 DC |
| 4,117,807 | 10/1978 | Barnard | 123/630 |
| 4,213,426 | 7/1980 | Longhouse | 123/41.49 |
| 4,459,943 | 7/1984 | Goodman | 123/25 K |
| 4,502,420 | 3/1985 | Mezger | 123/25 C |
| 4,558,665 | 12/1985 | Sandberg et al. | 123/25 C |
| 4,774,911 | 10/1988 | Yamaguchi et al. | 123/41.49 |
| 4,895,120 | 1/1990 | Tobinaga et al. | 123/198 DC |
| 5,050,571 | 9/1991 | Daniels | 123/546 |
| 5,125,366 | 6/1992 | Hobbs | 123/25 C |
| 5,247,919 | 9/1993 | Akaki et al. | 123/625 |

Primary Examiner—E. Rollins Cross
Assistant Examiner—Erick Solis
Attorney, Agent, or Firm—Sughrue, Mion, Zinn, Macpeak & Seas

[57] ABSTRACT

A vaporized fuel injection system for an internal combustion engine includes a housing adapted to be mounted on the engine and having a vaporizer heat shell therein connected to the engine for receiving hot exhaust gases. Air is compressed by means of compressor blades mounted at the tips of the conventional fan blades for the engine. The compressor blades travel in a shroud whereby the air is compressed and supplied to the housing where it passes over the vaporizer heat shell. A fuel vaporization chamber is formed directly on the heat shell and liquid fuel is injected directly onto the heated shell for vaporizing the fuel. When the engine is cold, the liquid fuel may be injected directly onto glow plugs disposed in communication with the chamber. The heated compressed air is delivered to an outlet passage having a throttle valve therein and the vaporized fuel is delivered through the outlet passage downstream of the throttle valve to provide an air/fuel vapor mixture which is delivered to each combustion chamber of the engine. A liquid coolant is injected directly into each combustion chamber to control the combustion temperature.

13 Claims, 24 Drawing Sheets

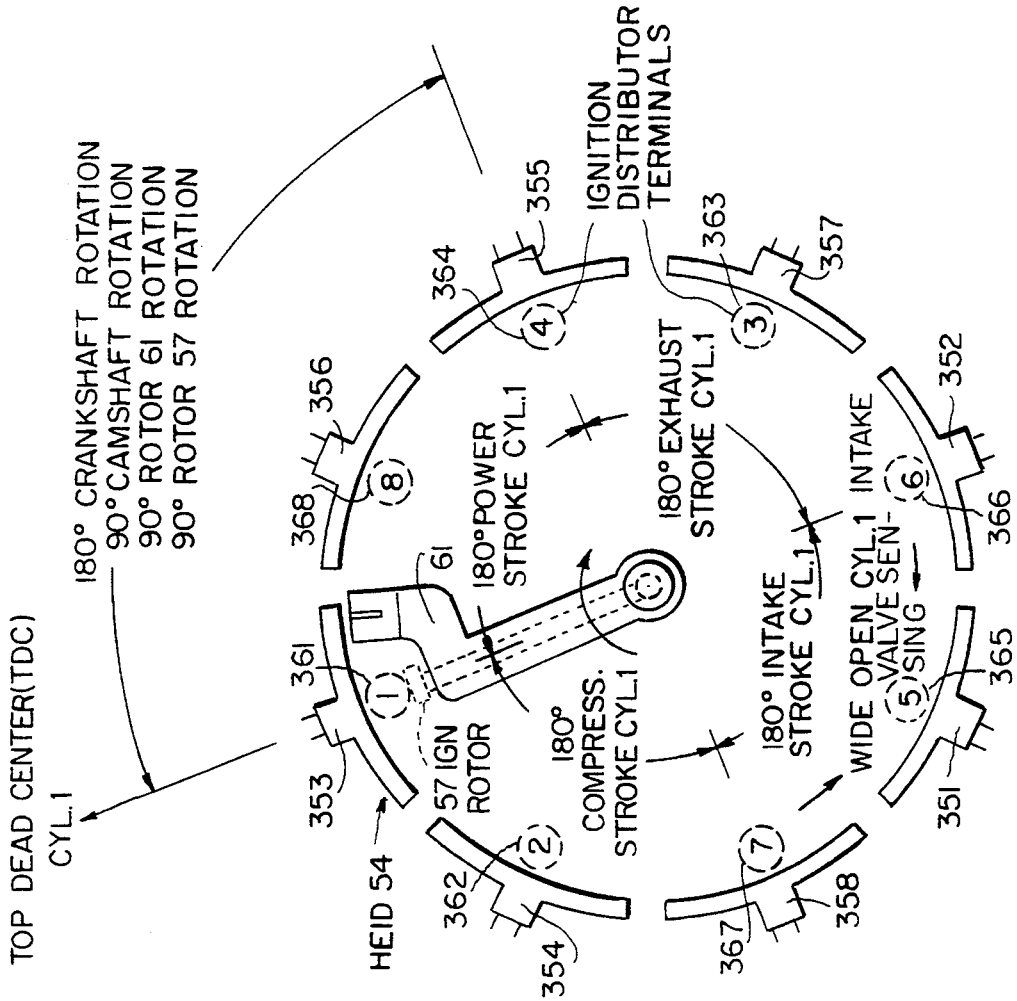
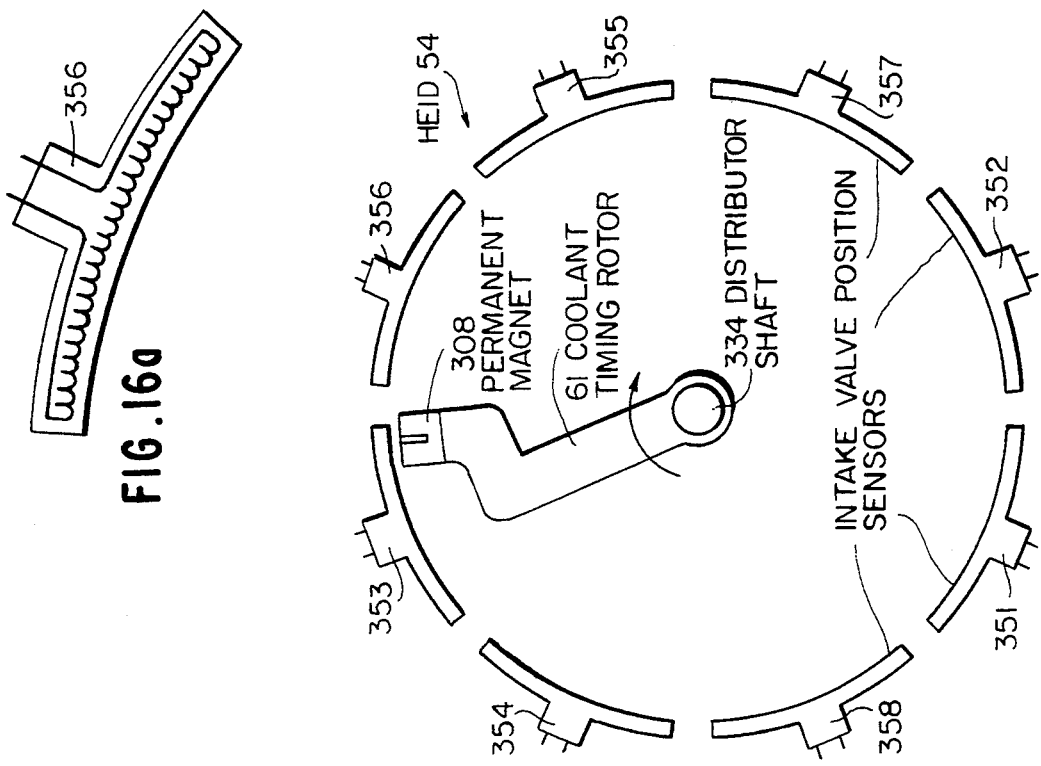

VAPORIZED FUEL INJECTION SYSTEM

BACKGROUND OF THE INVENTION

The present invention is directed to a vaporized fuel injection system for internal combustion engines and more specifically, to a system for vaporizing the fuel in a heated chamber and introducing the vaporized fuel and preheated compressed air into an intake manifold for distribution to the combustion chamber and subsequently controlling the temperature of the engine by directly injecting a finely atomized liquid coolant spray directly into the combustion chamber.

For many years, there has been an ongoing quest to achieve complete combustion of an air/liquid fuel charge within the combustion chamber of an engine in order to reduce exhaust emissions while increasing fuel economy. However, it is extremely difficult to meter, finely atomize the liquid fuel and blend the same with the intake air stream in order to approach complete combustion of the mixture. It is also extremely difficult to ensure reliable ignition of the lean air/liquid fuel charge within the combustion chamber and to manage the high temperatures associated with the complete combustion of the air/fuel mixture. Any attempt to introduce liquid hydrocarbon fuel into the intake air stream of a normally aspirated internal combustion engine, guarantees a fuel rich air/fuel mixture eliminating any possibility of complete combustion, thereby guaranteeing the production of carbon monoxide. Liquid fuel/air mixtures will not burn. Part of the liquid fuel must vaporize into vapor fuel and intermingle with the oxygen contained within the intake air before the mixture will burn.

An early pioneer in the field of vaporized fuel/air mixtures for internal combustion engines was Charles N. Pogue, who obtained the following U.S. Patents for carburetors for providing a vaporized fuel/air mixture for introduction into internal combustion engines:

| U.S. Pat. No. 1,750,354 | March 11, 1930    | CARBURETOR |
| U.S. Pat. No. 1,869,531 | June 9, 1931      | CARBURETOR |
| U.S. Pat. No. 1,938,497 | December 5, 1933  | CARBURETOR |
| U.S. Pat. No. 1,997,497 | April 9, 1935     | CARBURETOR |
| U.S. Pat. No. 2,026,798 | January 7, 1936   | CARBURETOR |

In each of the Pogue patents, gasoline is sprayed into a heated chamber wherein the atomized liquid gasoline will vaporize and air under pressure is introduced into the chamber. The combustible mixture of air and vaporized gasoline is then introduced into the intake manifold of the internal combustion engine. However, by having a vaporized gasoline mixed with the air externally of the intake manifold, the danger of premature combustion of the mixture is increased.

SUMMARY OF THE INVENTION

The present invention provides a new and improved computer controlled vaporized fuel injection system which substantially eliminates the danger of premature combustion while greatly increasing the efficiency of the combustion process.

The present invention provides a new and improved system to overcome the three major problems associated with complete combustion of a hydrocarbon fuel/air mixture which are:

1. Maintaining the fuel in a vaporous state throughout the intake and combustion process.
2. Assuring reliable ignition of the lean vapor fuel/air mixture.
3. Controlling the high combustion temperatures associated with complete combustion of said mixture.

The present invention provides a new and improved vaporized fuel injection system wherein the fuel is injected into a vaporization chamber mounted directly on an internal combustion engine. The vaporization chamber is exposed to an exhaust gas passage extending through the vaporizer housing. When the engine is cold, the liquid fuel is injected directly onto heated glow plugs which will instantly vaporize the fuel and once the engine is heated, the liquid fuel will be injected directly onto a vaporization plate heated by the exhaust gasses from the engine.

The present invention provides a new and improved vaporized fuel injection system having an improved air compression and injection system wherein compressor blades mounted on the ends of a conventional cooling fan for an internal combustion engine rotate in a volute chamber surrounding the fan to compress the air. The normal air flow through the engine radiator is preheated by heat transfer from the radiator and a portion of the preheated air is compressed and introduced into a chamber surrounding the vaporization chamber and heat shell whereby the air is further heated before introduction into the intake manifold of the internal combustion engine. An auxiliary electric heater could also be located in the chamber. The purpose for compressing the heated, expanded intake air is to insure the same or greater oxygen content per given volume of heated air as contained in the same given volume of uncompressed cold air. The vaporized fuel is drawn into the intake manifold through a plurality of circumferentially arranged ports for a complete mixture of the air and vaporized fuel prior to introduction into the individual combustion chambers of the engine.

The present invention provides a new and improved ignition system wherein the standard ignition voltage is further amplified for sufficient energy to function with wide-gap and rail-type ignition plugs. The new and improved ignition system also provides individual combustion chamber ignition control whereby ignition to a particular combustion chamber may be grounded to prevent heat damage to said combustion chamber. The ignition system rotation means is also used to provide timed liquid coolant injection directly into individual combustion chambers.

The present invention provides a new and improved vaporized fuel injection system having improved temperature control means for the combustion of the vaporized fuel/air mixture in the combustion chambers wherein a coolant fluid is injected directly into each combustion chamber.

The present invention provides a new and improved vaporized fuel injection system wherein the foregoing vaporizing of the fuel, the compressing and preheating of the air, the mixing of the air and vaporized fuel, the ignition of said mixture and the injecting of the cooling liquid before or during combustion, are all operated under the control of a computerized engine control module responsive to a number of parameters associated with an internal combustion engine and accessories related thereto.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 16 is a sectional view taken along the line 16—16 of FIG. 4.

FIG. 16a is an enlarged section view of the intake valve position sensor.

FIG. 16b is a sectional view taken along the line 16—16 of FIG. 4 depicting angular rotation in degrees of crankshaft verses camshaft, rotors 57 and 61 for cylinder number one.

DETAILED DESCRIPTION OF THE INVENTION

Figure 1:
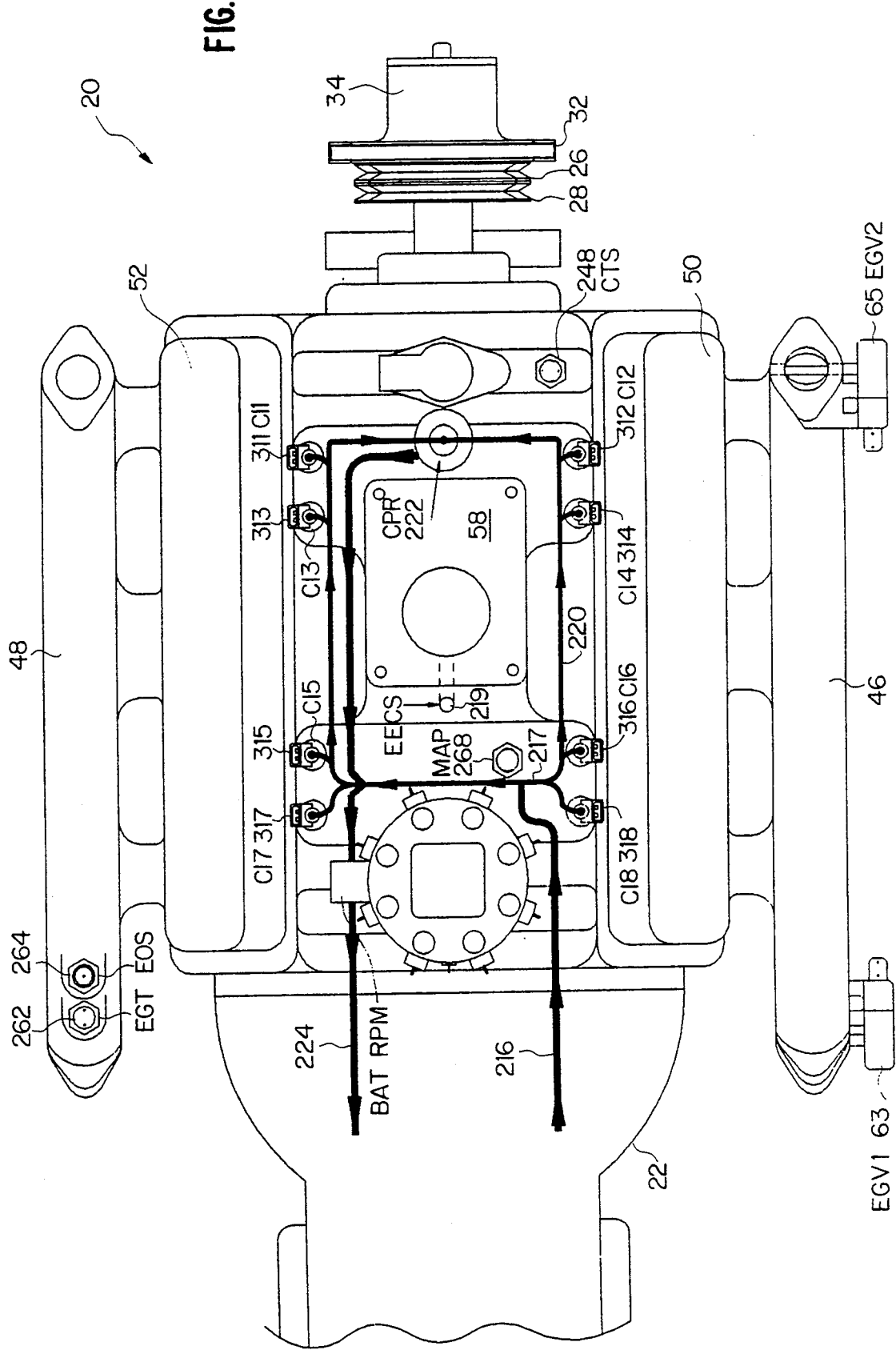
FIG. 1 is a schematic top plan view of an internal combustion engine showing the liquid coolant flow path
Figure 2:
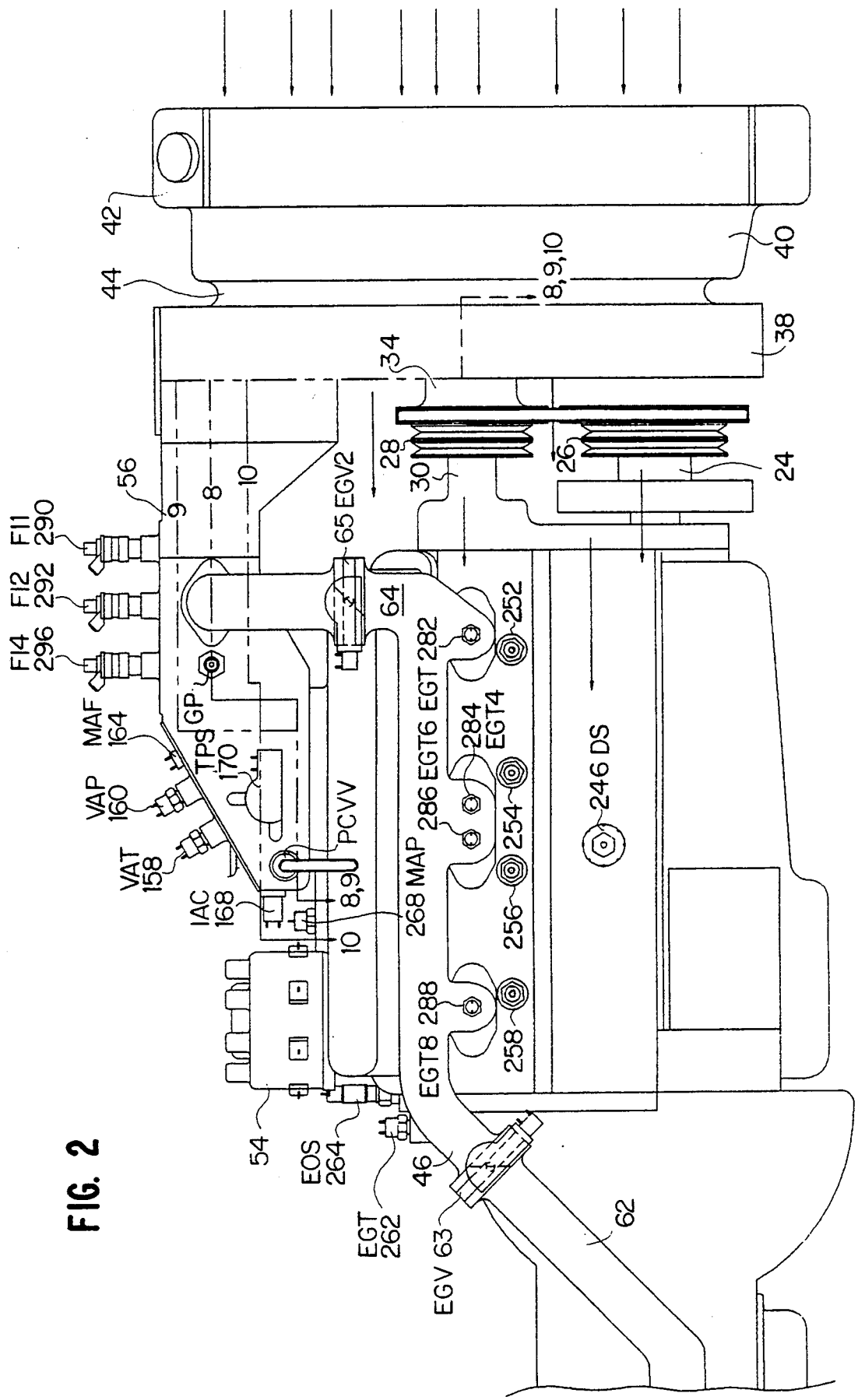
FIG. 2 is a side elevation view of one side of an internal combustion engine showing the compressor housing and vaporizer housing.
Figure 3:
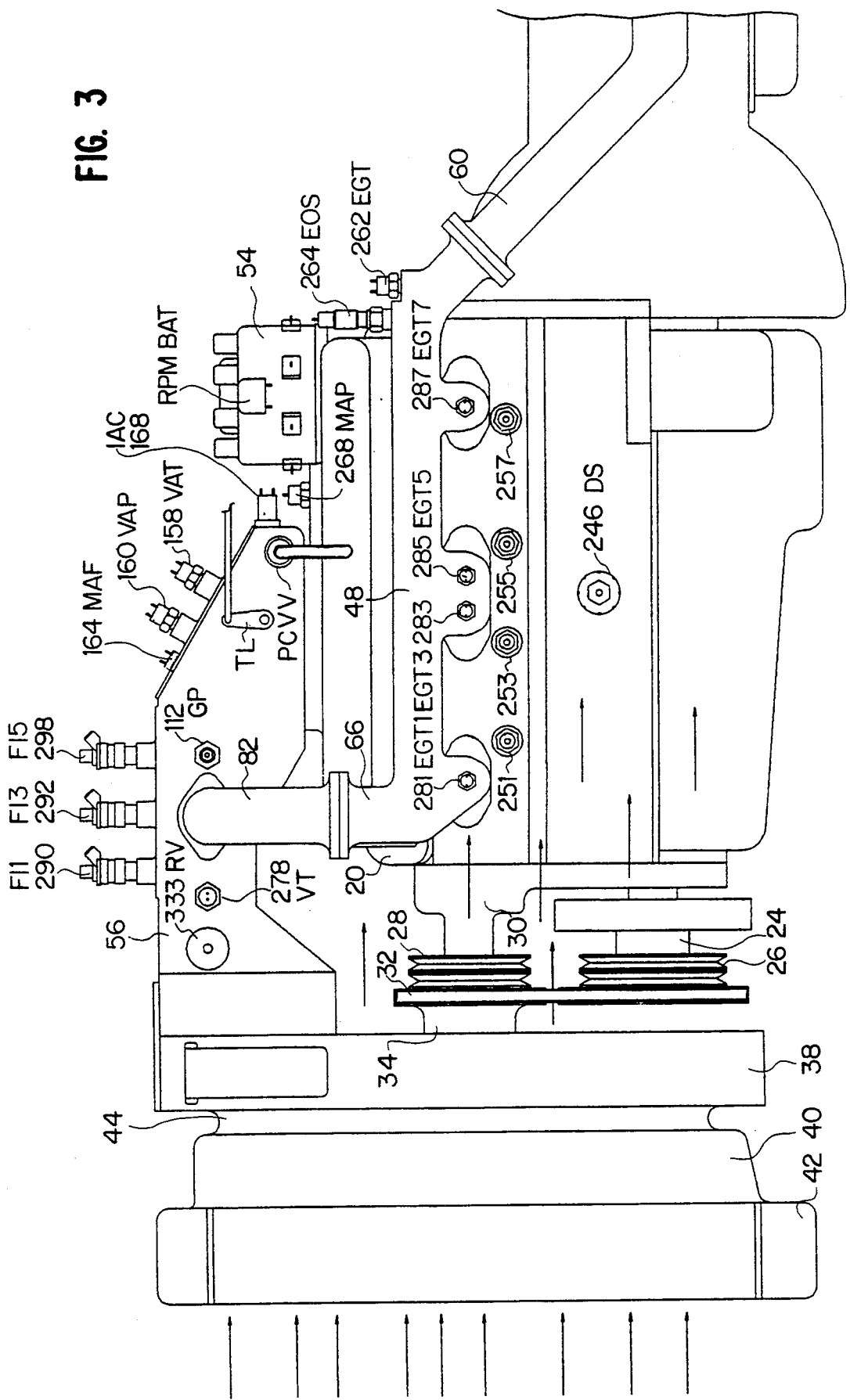
FIG. 3 is a side elevation view of an opposite side of the internal combustion engine showing additional details of the compressor housing and vaporizer housing relative to the internal combustion engine.
Figure 4:
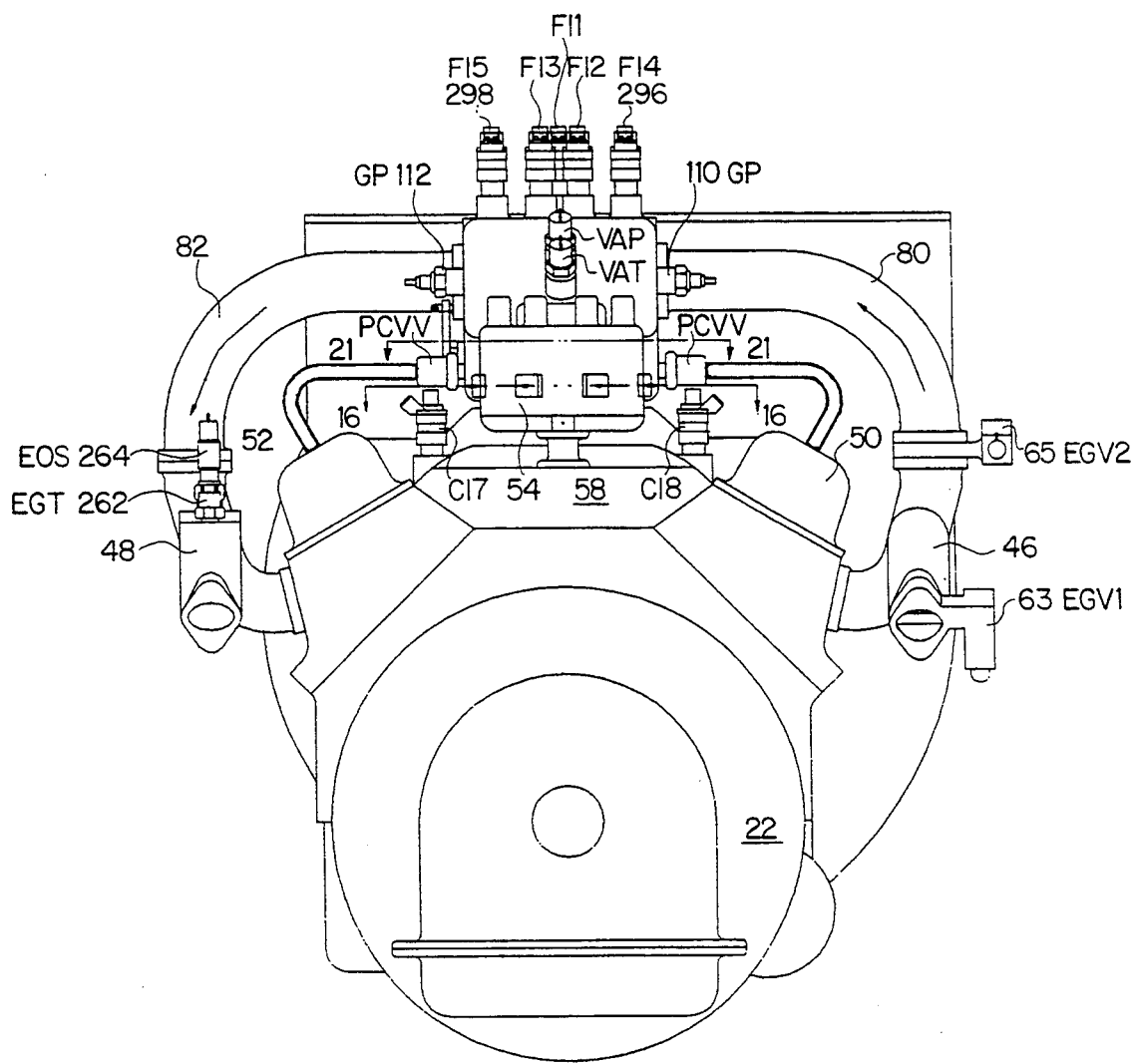
FIG. 4 is a rear elevational view of the internal combustion engine and transmission assembly and the relationship of the vaporizer housing to the exhaust manifolds on opposite sides of the engine.

While the vaporized fuel injection system according to the present invention may be used with any internal combustion engine, the system has been shown in conjunction with a conventional V-8 engine 20. A transmission 22 is secured to one end of the engine 20 while the output shaft 24 of the engine extends forwardly of the opposite end and has a multiple groove pulley 26 secured thereon. A second multiple groove pulley 28 is rotatably mounted on a support 30 above the pulley 26 and is rotatably connected to pulley 26 by means of an endless belt 32. A fan hub 34 is connected to the pulley 28 and a plurality of radially extending fan blades 36 are mounted on the opposite end of the hub 34. A compressor housing 38 surrounds the fan blades 36 and will be described in greater detail hereinafter. An air shroud 40 is connected to one side of the radiator assembly 42 closest to the engine 20 in alignment with the fan blades. The air shroud 40 is connected to the compressor housing 38 by means of a flexible seal 44.

As viewed in FIG. 1, the engine is further provided with a right hand exhaust manifold 46 and a left hand exhaust manifold 48 when viewed from the rear of the engine. The engine is also provided with a right hand valve cover 50 and a left hand valve cover 52. A distributor assembly 54 which will be described in greater detail hereinafter, is mounted on top of the engine adjacent the rear end of the engine and a vaporizer housing 56 as shown in FIGS. 2-10 inclusive is mounted on top of the engine above the intake manifold 58. The left hand exhaust manifold 48 is connected at the rear end thereof to an exhaust pipe 60 and the right hand exhaust manifold 46 is connected at the rear end to an exhaust pipe 62. An electrically controlled exhaust gas valve EGV1 63 is mounted in the connection between the right hand exhaust manifold 46 and the exhaust pipe 62. The forward end of each exhaust manifold 46, 48 is provided with a riser 64, 66.

Figure 6:
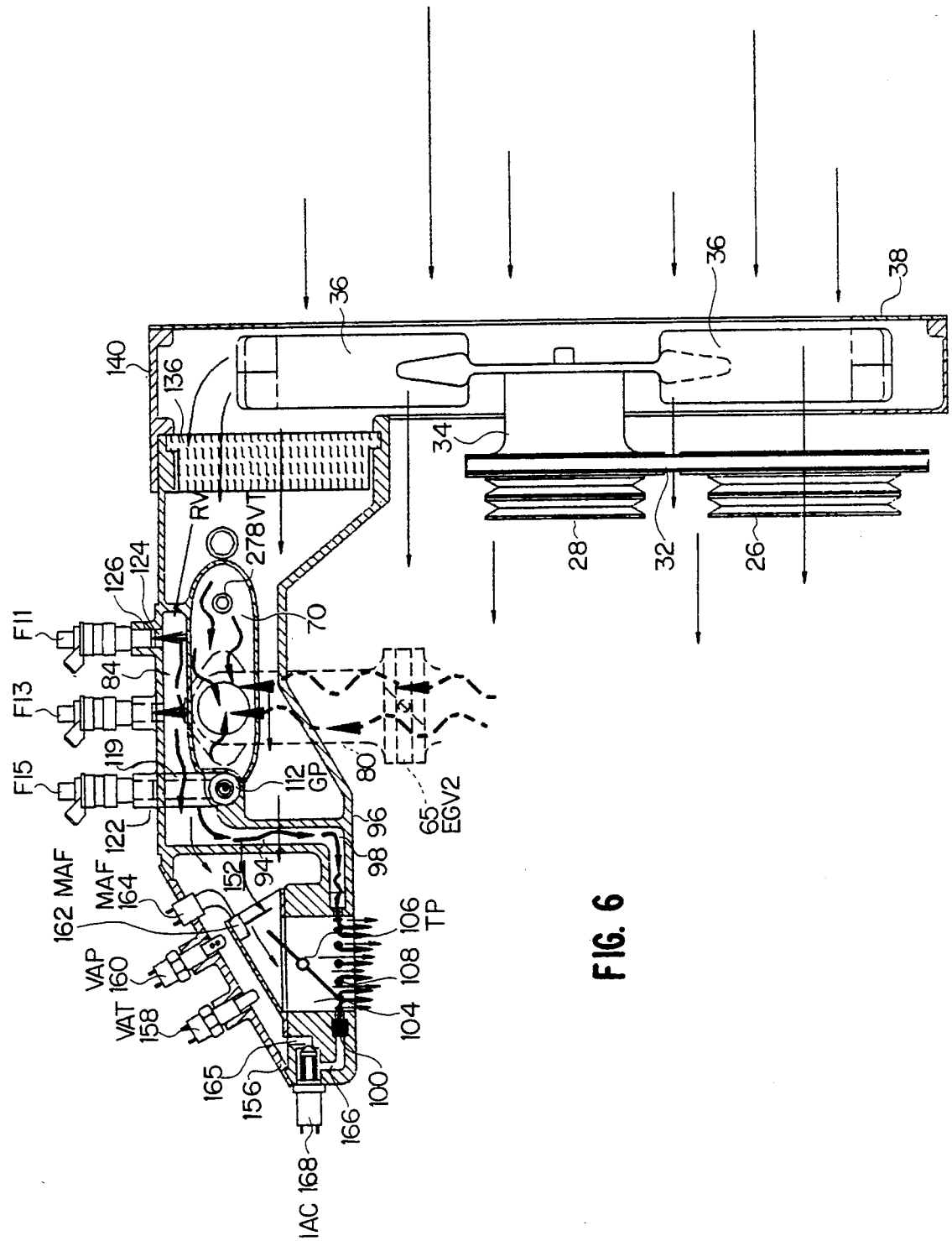
FIG. 6 is a partial, sectional side elevation view, taken along the line 6—6 in FIG. 7, of the compressor assembly and the vaporizer assembly, showing the respective flow paths for liquid fuel, vaporized fuel, normal air flow, compressed air flow and exhaust gas flow.
Figure 7:
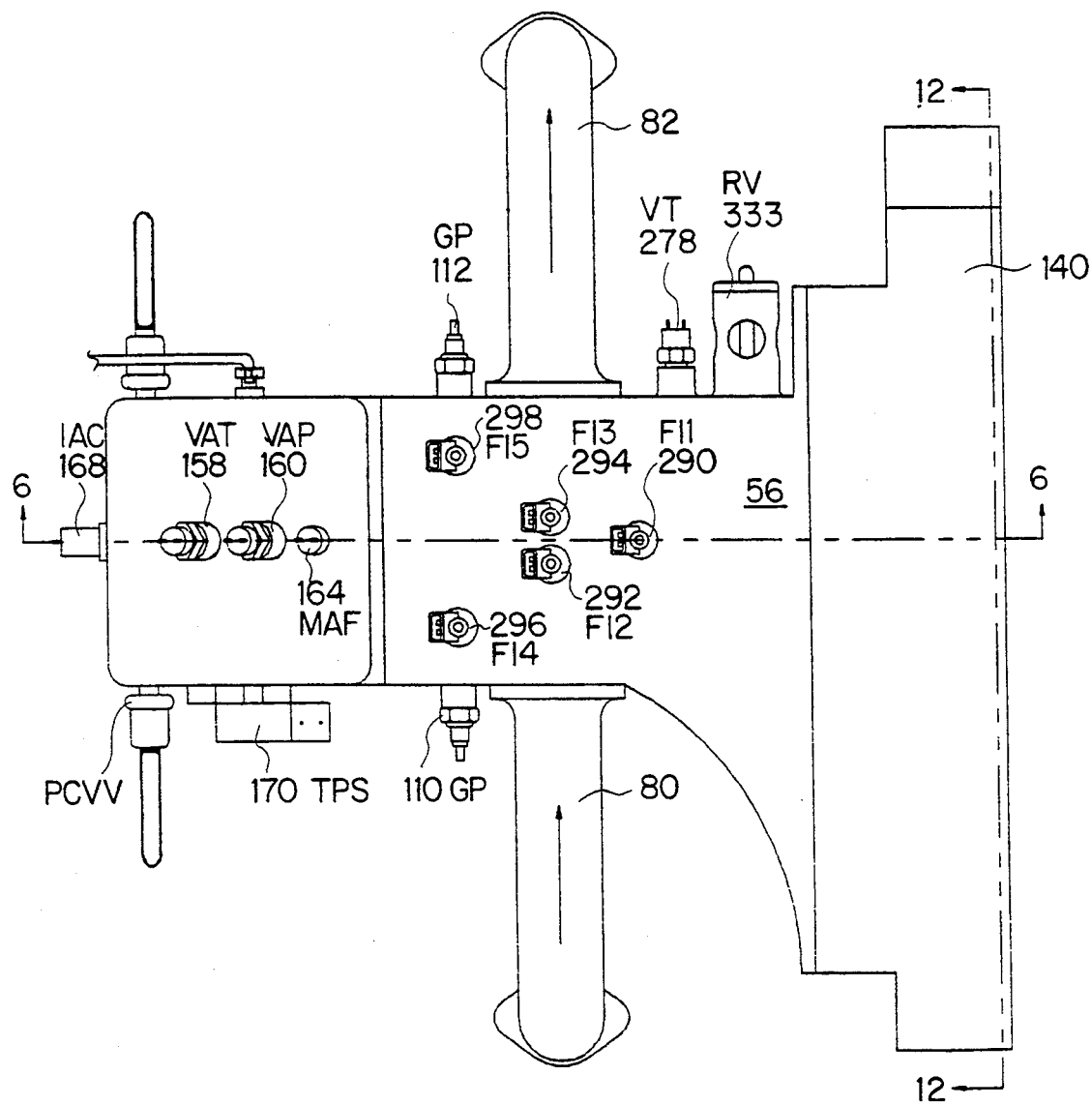
FIG. 7 is a top plan view of the compressor and vaporizer assembly, per se.
Figure 8:
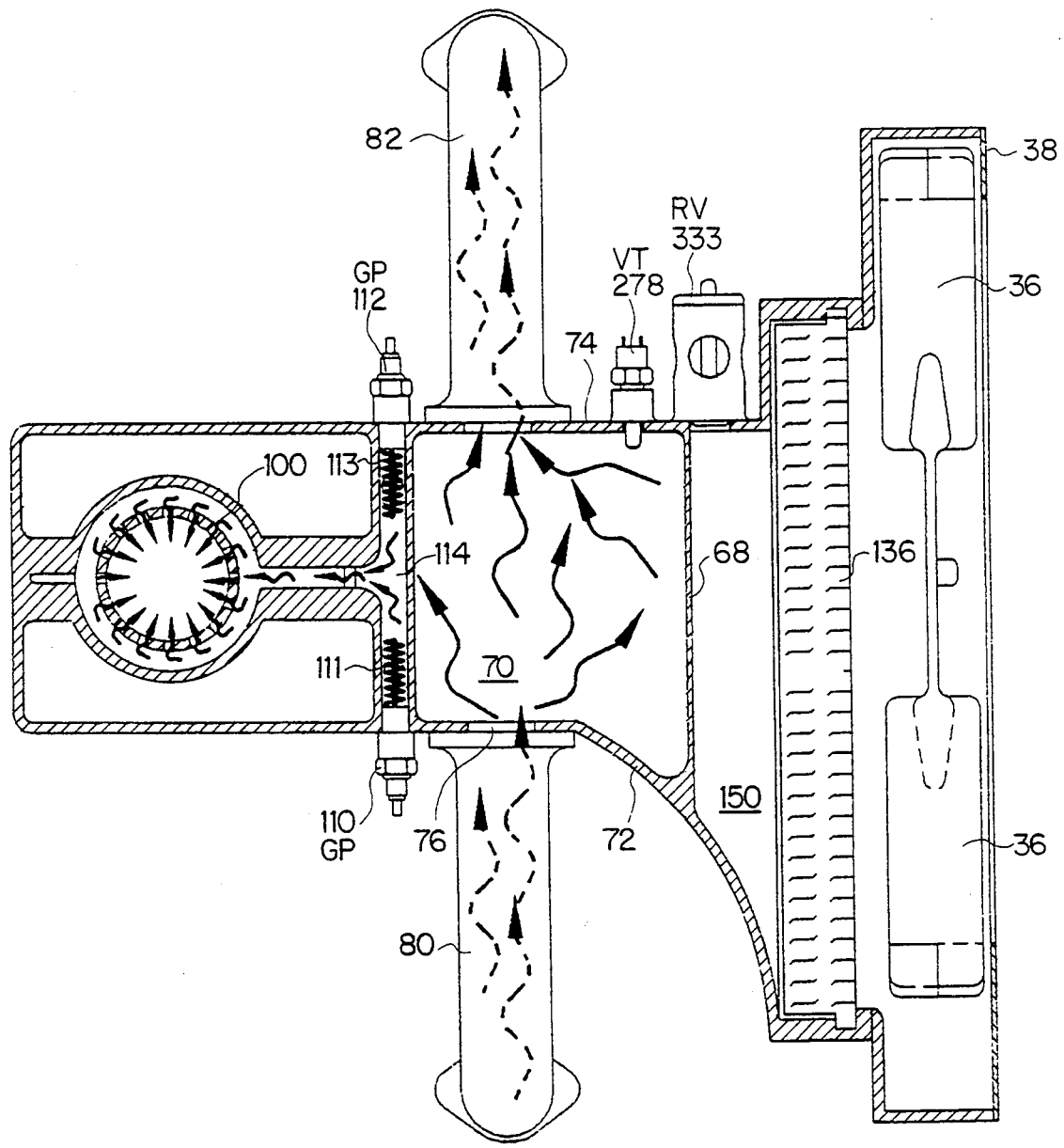
FIG. 8 is a sectional view taken along the line 8—8 in FIG. 2.
Figure 9:
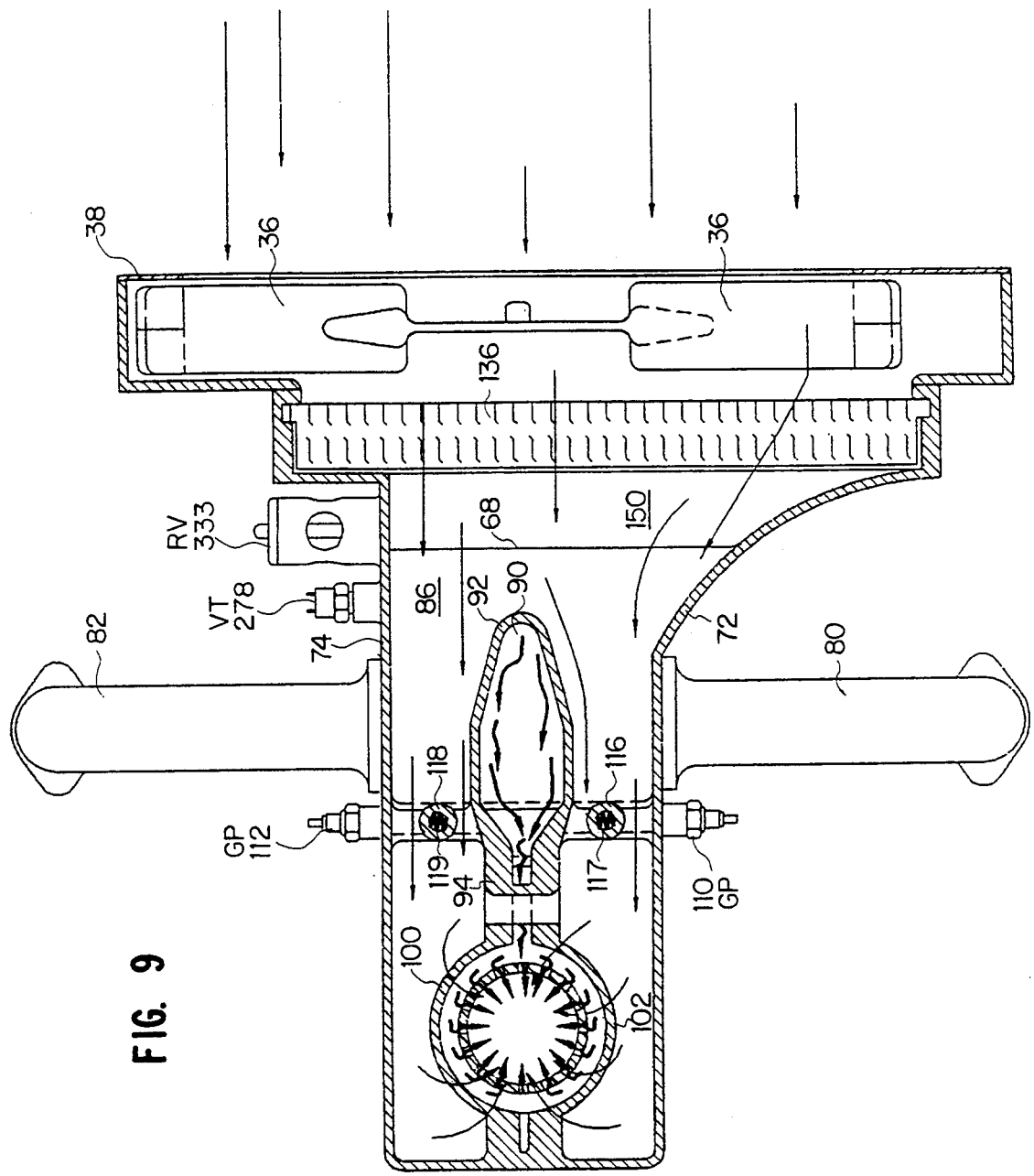
FIG. 9 is a sectional view taken along the line 9—9 in FIG. 2.
Figure 10:
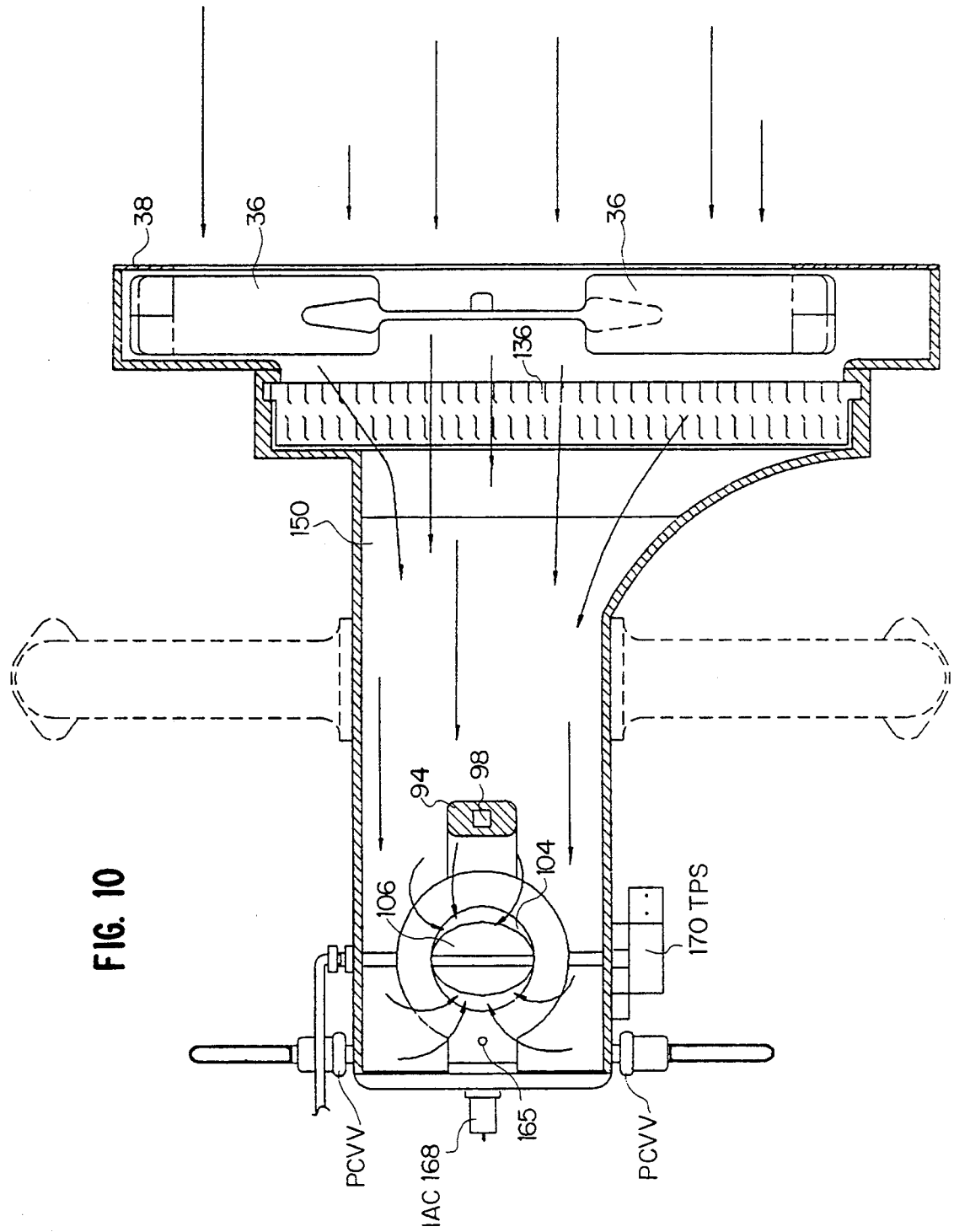
FIG. 10 is a sectional view taken along the line 10—10 in FIG. 2.

A heat shell 68 extends transversely of the vaporizer housing 56 in the interior thereof from one side of the vaporizer housing to the other as shown in FIG. 8. The shell 68 has an oval cross sectional configuration as shown in FIG. 6 to define a heat chamber 70. The opposite side walls 72 and 74 of the vaporizer housing 56 are provided with ports 76 and 78 which communicate with exhaust gas pipes 80 and 82 which are connected between the ports 76 and 78 and the exhaust manifold risers 64 and 66, respectively. A second exhaust gas valve EGV2 65 is electrically operated and interposed in the connection between the exhaust pipe 80 and the right hand exhaust manifold riser 64. Thus, upon closing the exhaust gas valve EGV1 63 and opening the exhaust gas valve EGV2 65, the hot exhaust gases from the four cylinders on the right hand side of the engine will be directed through the heating chamber 70 defined in the vaporizer heat shell 68. The exhaust gases will then exit through the left hand exhaust manifold 48 to the exhaust pipe 60. Thus, the entire surface of the heat shell 68 is heated to very high temperatures due to the passage of the hot exhaust gases therethrough from four of the eight cylinders. The duration of gas passage and the temperature of the shell 68 can be controlled by appropriate operation of the exhaust gas valves EGV1 63 and EGV2 65 which are operated under the control of the computerized electronic engine control module ECM 240.

A fuel vaporization chamber 84 is provided between the upper wall 86 of the shell 68 and the top wall 88 of the vaporizer housing 56. A fuel vaporizing hot plate area 90 is provided on the upper surface 86 of the shell 68 and is defined by a peripheral wall 92 extending between the upper surface 86 of the shell 68 and the upper wall 88 of the vaporizer housing 56. The peripheral wall 92 terminates in a hollow, vertically extending post 94 extending between the top wall 88 and the bottom wall 96 of the vaporizer housing 56. The hollow post 94 defines a bore 98, the upper end of which is disposed in communication with the vaporizer chamber 84. The lower end of the bore 98 communicates with an annular ring passage 100 in an annular member 102 which defines the inlet 104 for the intake manifold 58 which is located directed therebeneath. A throttle plate 106 is pivotally mounted in the inlet 104 above a plurality of inlet ports 108 disposed in communication with the fuel vapor ring passage 100.

When the engine is cold, a pair of glow plugs 110, 112 are used to vaporize the fuel prior to entry into the bore 98. The glow plugs 110 and 112 are seated in opposite ends of a transversely extending bore 114 formed in a thickened edge portion of the shell 68 which connects with the post 94. The middle portion of the bore 114 is disposed in communication with the rear of the vaporizer chamber 84 immediately before the connection of the chamber 84 with the vertical bore 98. A pair of hollow tubular posts 116 and 118 extend between the upper wall 88 of the vaporizer housing 56 and the thickened rear portion of the shell 68 with the bores 117 and 119 of each hollow tubular post extending through the top wall 88 and the thickened rear portion of the shell 68 in communication with the transverse bore 114 directly above the heating elements 111 and 113 of the respective glow plugs 110 and 112. Annular support flanges 120 and 122 are mounted on the upper surface of the top wall 88 of the vaporizer housing 56 about the respective bores 117 and 119 of the posts 116 and 118 and a pair of fuel injectors FI4 296 and FI5 298 are mounted in the flanges whereby fuel can be directly injected downwardly through the bores 117 and 119 onto the heating elements 111 and 113 of the glow plugs 110 and 112.

Three additional bores, one of which is shown at 124 in FIG. 6, are formed through the top plate 88 of the vaporizer housing 56 directly above the fuel vaporizing hot plate area 90 and an annular support flange such as the support flange 126 is formed about each bore respectively. Fuel injectors FI1 290, FI2 292 and FI3 294 are mounted in the respective support flanges, whereby fuel can be injected directly onto the hot plate 90 of the shell 96 for vaporizing the fuel. The sequencing of the fuel injectors FI1 290-FI5 298 is controlled by the computerized engine control module as will be discussed hereinafter. A vapor temperature sensor VT 278 extends into the heat chamber 70 through the side wall 74 of the vaporizer housing 56 as shown in FIGS. 6-9. The sensor VT 278 is a resistor that, when heated or cooled, changes its output voltage. This determines whether or not the vaporizer hot plate 90 is hot enough to perform the vaporization.

Figure 11:
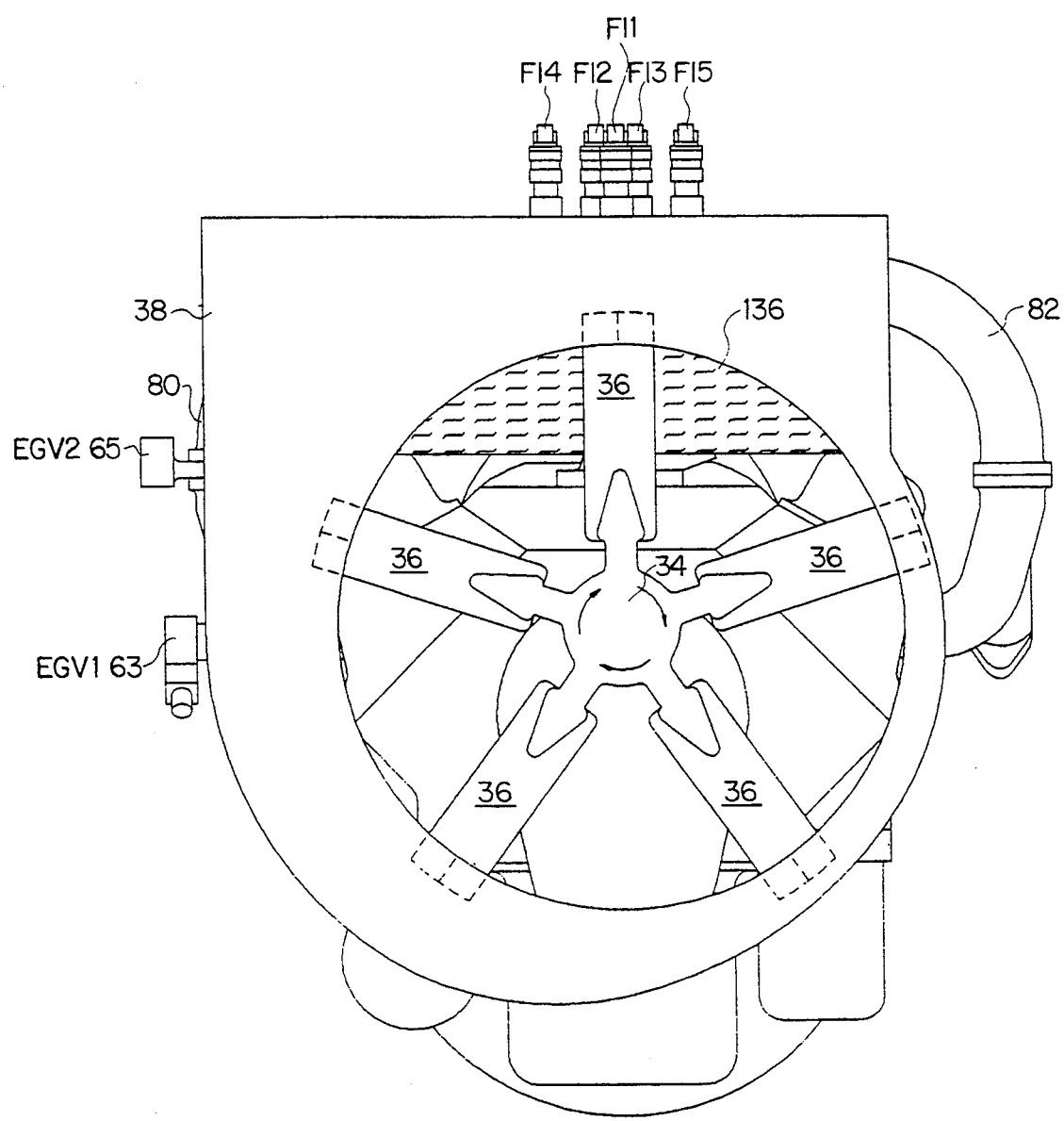
FIG. 11 is a front elevation view of the compressor unit on the internal combustion engine.
Figure 12:
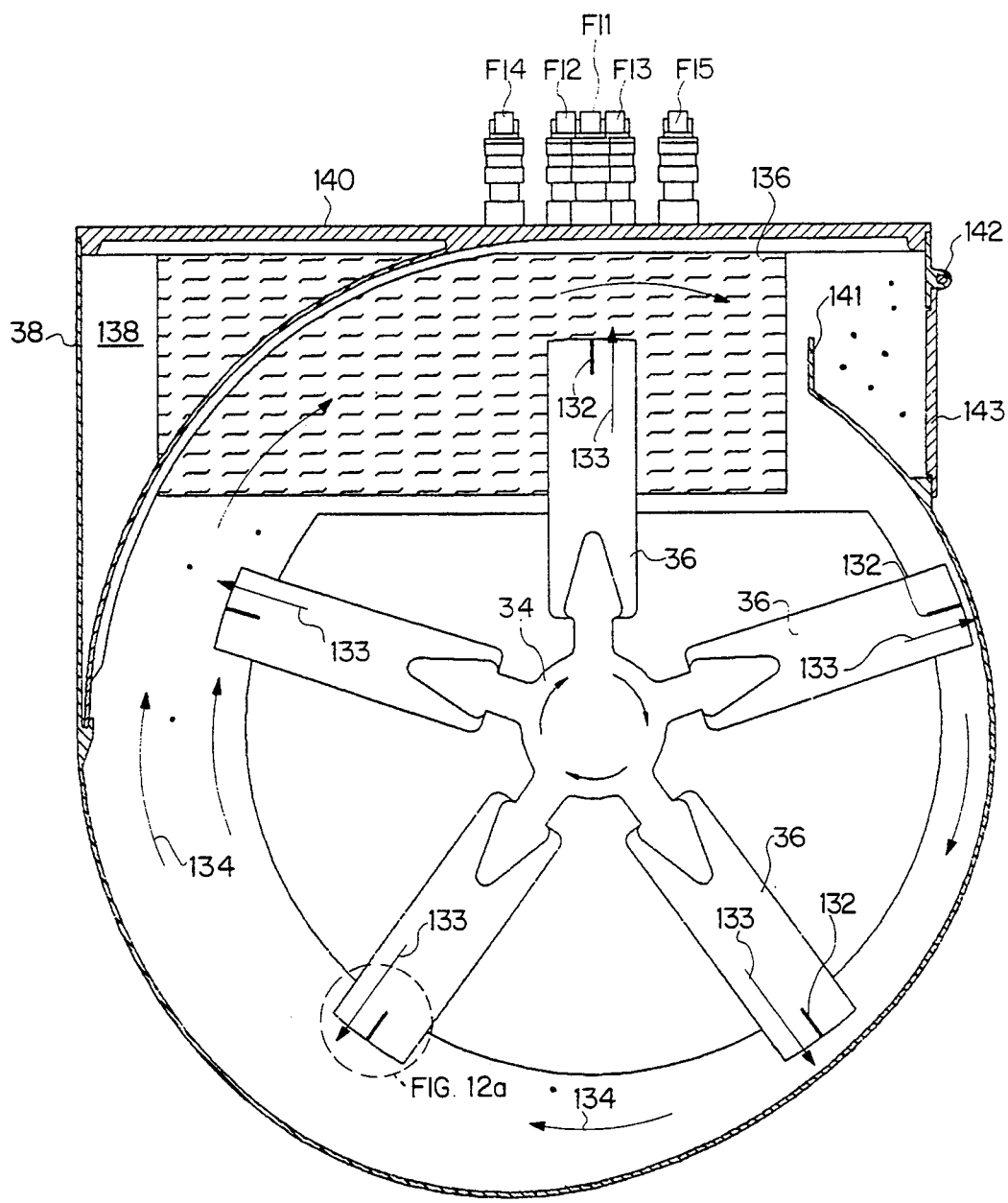
FIG. 12 is a sectional view taken along the line 12—12 of FIG. 7.
Figure 12A:
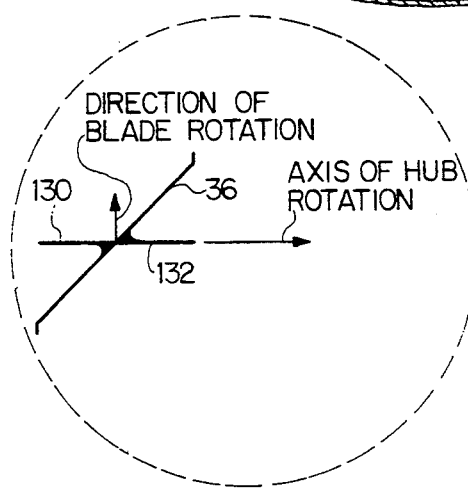
FIG. 12a is a radial end view of a fan blade shown in FIG. 12.

With respect to the air flow, specifically the compressing of the air and the heating of the air prior to injection into the intake manifold, attention is first directed to FIGS. 11, 12 and 12a, which show the details of the fan and compressor assembly. Each fan blade 36 is provided with a pair of compressor vanes 130 and 132 on opposite sides thereof adjacent the radially outermost end of the blade, as shown in FIGS. 12 and 12a. The end portion of each blade with the compressor vanes thereon, is disposed in a compressor housing 38 having a volute configuration. As the fan rotates in the direction of the arrows on the fan hub 34 as shown in FIG. 12, the main portion of each blade 36 will generate a flow of air parallel to the axis of rotation of the fan hub for forcing air rearwardly over the engine. The tip portions of the fan blades 36 will cause radial and angular air flow in the direction of the arrows 133 and 134 in FIG. 12 which will compress the air and direct the air into the vicinity of an air filter 136 disposed in a filter housing 138. A filter access cover 140 is detachably mounted at the top of the filter housing 138 to enable the filter to be cleaned or exchanged. Any dirt particles or other heavy particles entrapped in the compressed radial and angular air flow will be impelled by centrifugal force into a heavy particle collector 141. A hatch 143 is pivoted at 142 to the filter housing 138 to enable removal of the heavy particles which have been collected.

Due to the pressure of the compressed air in the compressor housing 38, the air will be forced through the air filter into the heating chamber 150 in which the heating shell 68 is located. The air will flow over and under the shell 68 as indicated by the arrows, into a second chamber 152, located above the inlet to the intake manifold. An air guide 154 (which is the mass air flow [MAF] sensor 162 housing) having a sloping surface overlying the inlet 104 is secured to the upper surface of the annular member 102 surrounding the inlet 104. A cover 156 is provided on the vaporizer housing 156 over the chamber 152 parallel to the air guide 154. A vaporizer air temperature (VAT) sensor 158 and a vaporizer air pressure (VAP) sensor 160 are mounted on the cover 156 and extend into the chamber 152 for sensing the temperature and pressure in the chamber 152. An intake air mass air flow (MAF) sensor 162 is mounted inside the air shield 154 adjacent the entrance to the inlet 104 for sensing the mass air flow (MAF) into the intake manifold. A suitable connector 164 is mounted in the cover 156 and connected to the sensor 162 by wires. An engine idle air port 165 is in communication with the chamber 152 and communication of the port with the fuel vapor ring passage 100 through the passage 166 is controlled by an idle air control (IAC) solenoid valve 168. The flow of heated compressed air from the chamber 152 through the inlet 104 is controlled by the throttle valve plate 106 the position of which is sensed by a throttle position sensor (TPS) 170. The heated compressed air then mixes with the fuel vapors downstream of the throttle valve 106 at the entrance to the intake manifold.

Figure 5:
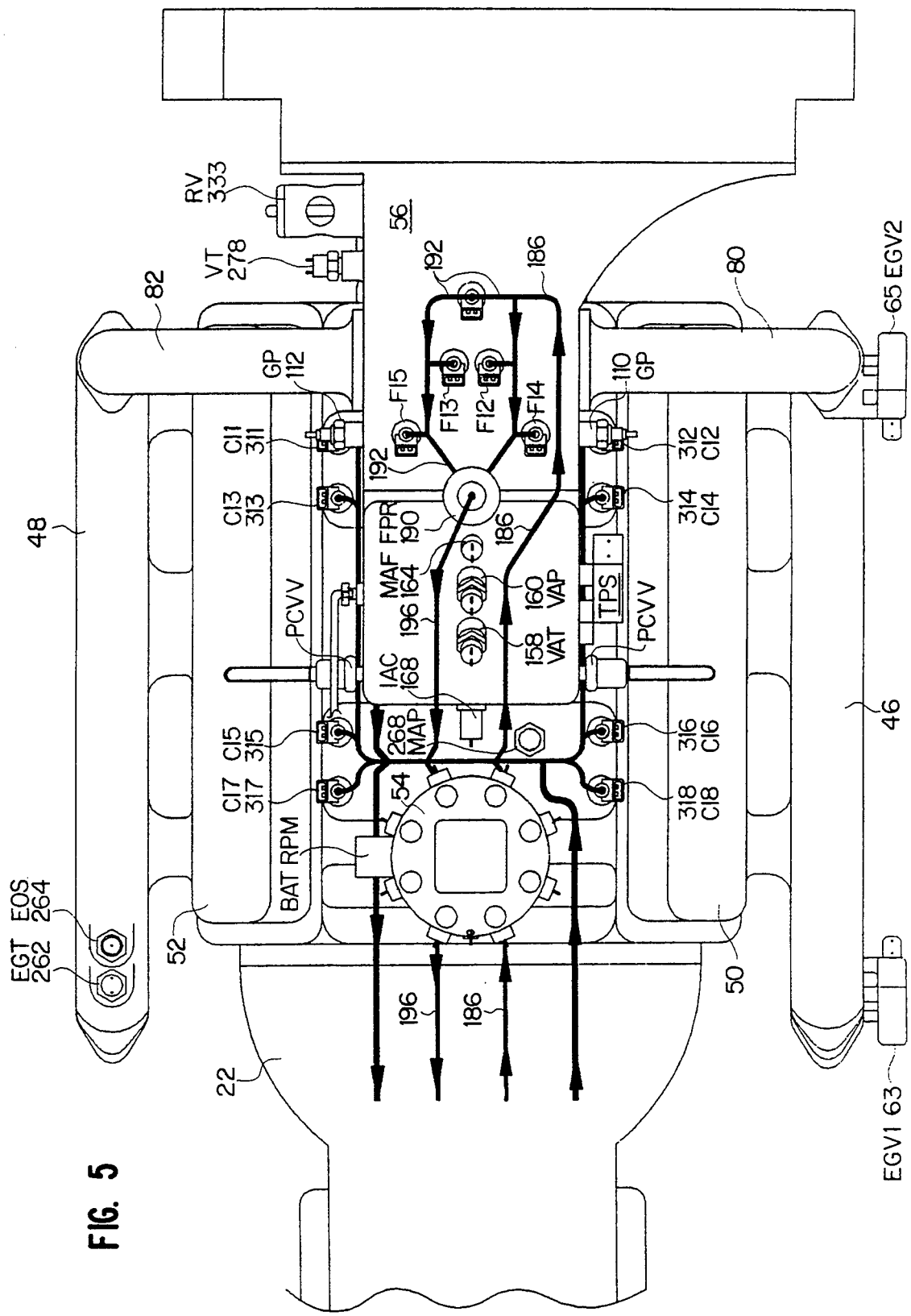
FIG. 5 is a schematic top plan view similar to FIG. 1 showing the liquid fuel flow path in addition to the liquid coolant flow path.
Figure 15:
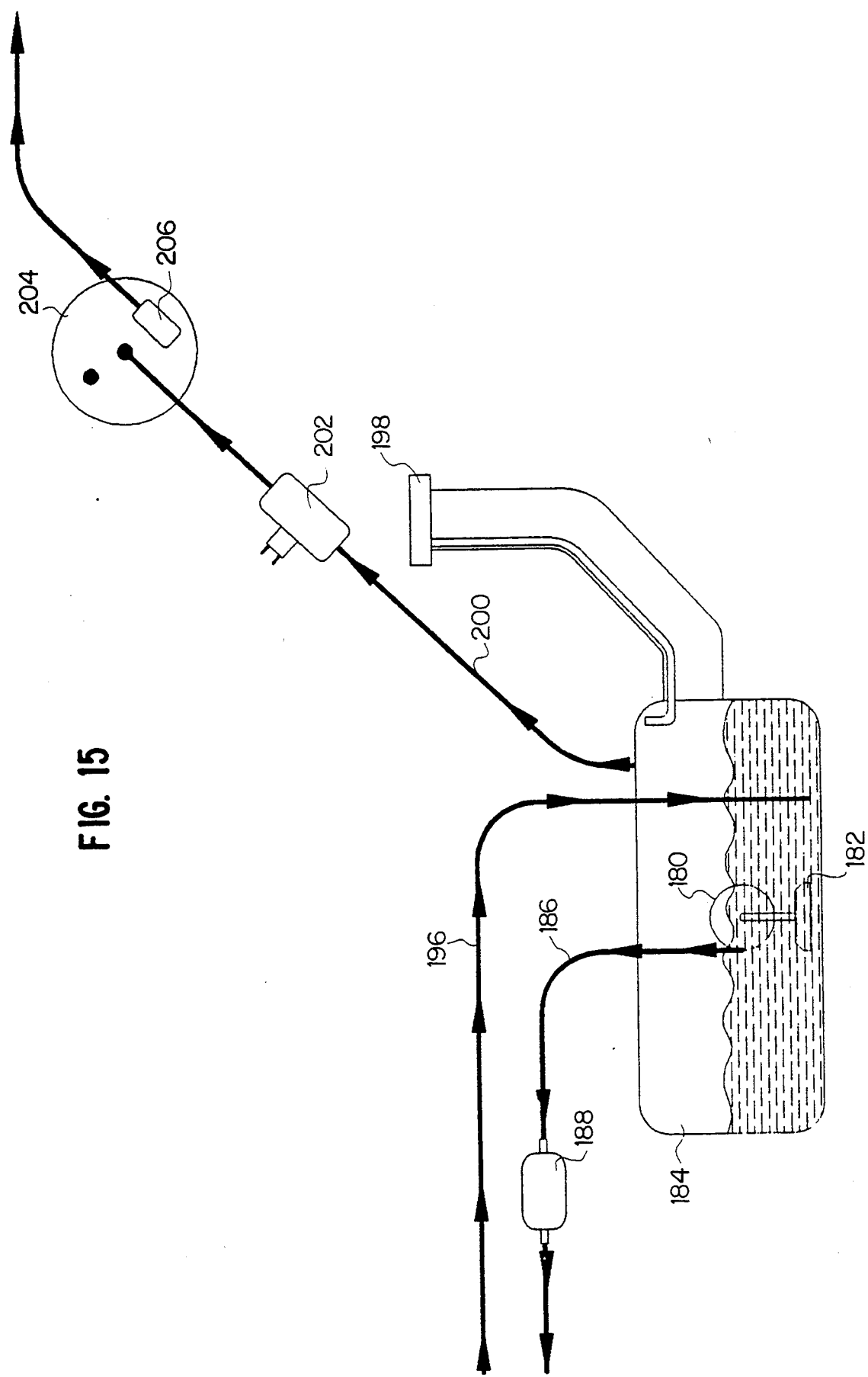
FIG. 15 is a schematic view of a liquid fuel storage and pumping system.

The fuel supply and return system is shown schematically in FIGS. 5 and 15. An electrically driven fuel pump 180 with an inlet strainer 182 is mounted within a fuel tank 184 along with a conventional fuel quantity gauge sender assembly (not shown). The pump 180 discharges into a fuel pressure line 186 equipped with an in line fuel filter 188 installed between a discharge port of the pump and a fuel distribution manifold assembly 192, commonly known as a "fuel rail". The fuel distribution assembly is simply a fuel manifold that supplies fuel to all fuel injectors and to the fuel pressure regulator (FPR) valve 190. More specifically, the fuel is delivered through the fuel pressure line 186 to the manifold 192 thus distributing fuel to the five fuel injectors FI1–FI5 (290–298) and the FPR valve 190. The FPR valve 190 discharges into the liquid fuel return line 196 and returns to the tank 184. The FPR valve 190 is a diaphragm-operated relief valve with fuel pump pressure on one side, regulator spring pressure and intake manifold air pressure (MAP) on the other side. The FPR valve 190 compensates for varying intake manifold pressures and maintains a constant pressure differential across the fuel injectors at all times. The fuel tank 184 is equipped with a pressure/vacuum relief vented fuel filler cap 198 and a vapor vent line connection 200 for the evaporative emission control system (EECS). The EECS is comprised of a fuel tank pressure control valve 202, a charcoal filled fuel vapor storage canister 204 equipped with an ECM controlled solenoid operated purge valve 206 with ambient air inlet and a purge line connected to the EECS port 219 in the intake manifold.

Figure 14:
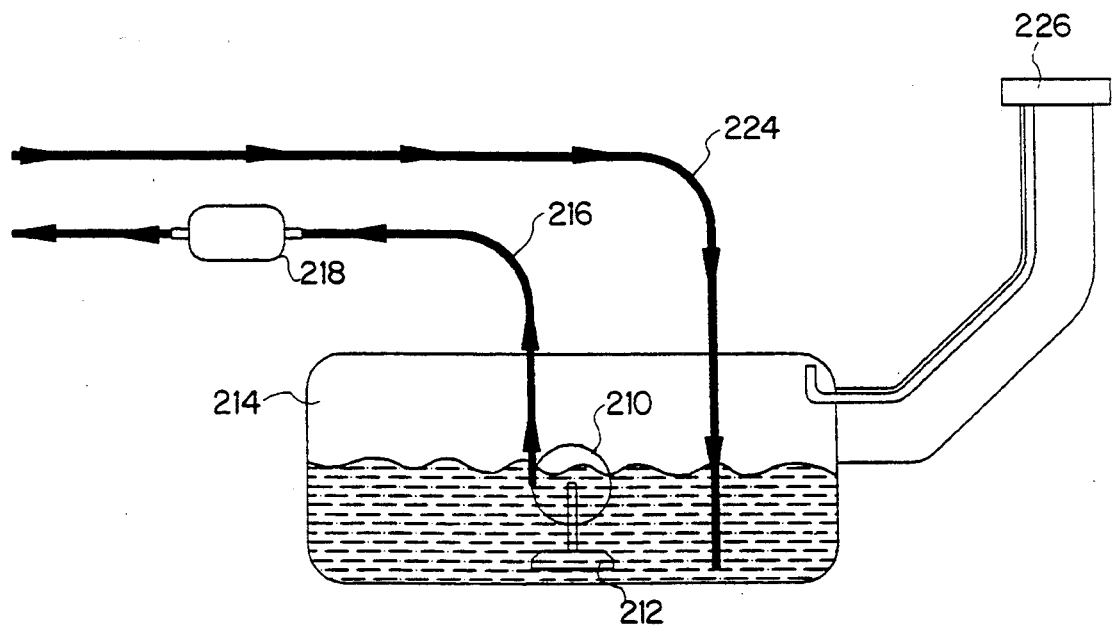
FIG. 14 is a schematic view of the coolant storage and pumping system.

The electric pump coolant delivery (EPCD) system is shown schematically in FIGS. 1, 5 and 14. The EPCD system employs an electric driven coolant pump 210 with an inlet strainer 212 mounted within the coolant tank 214 along with a coolant quantity gauge sender assembly (not shown). The pump 210 discharges into the coolant pressure line 216 equipped with an in-line coolant filter 218 installed between a discharge port in the coolant pump 210 and a coolant distribution assembly as shown in FIGS. 1 and 5. Liquid coolant is distributed from the coolant pressure line 216 to each of the coolant injectors CI1–CI8 (311–318) through branch lines 217 and 220 which are connected to the coolant pressure regulator (CPR) valve 222. A liquid coolant is returned from the CPR valve 222 to the tank 214 through the liquid coolant return line 224. The CPR valve 222 is a diaphragm operated relief valve with coolant pump pressure on one side, regulator spring pressure and intake manifold air pressure (MAP) on the other. The CPR valve 222 compensates for varying intake manifold air pressure and maintains a constant pressure differential across the coolant injectors at all times. The coolant tank is equipped with a pressure/vacuum relief vented filler cap 226.

Figure 13A:
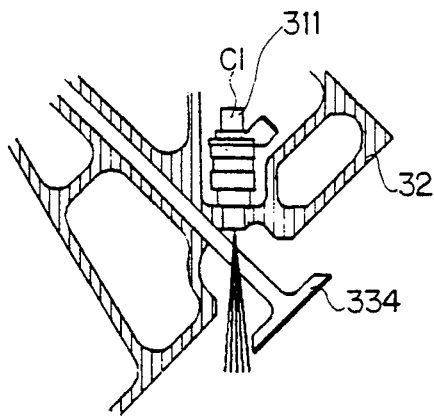
FIGS. 13a, 13b and 13c are partial sectional views showing variations of liquid coolant injection arrangements.
Figure 13B:
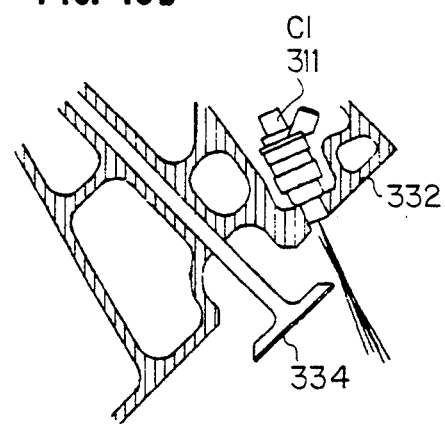
Figure 13C:
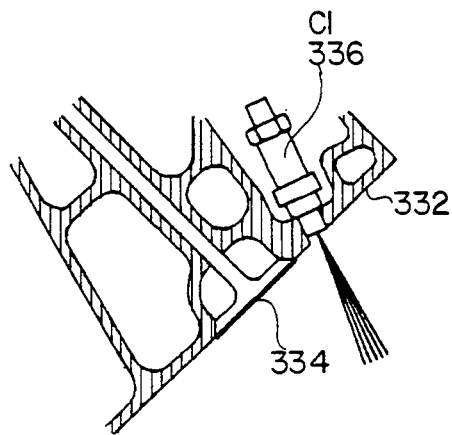

The arrangement of a typical coolant injector 311 is shown in FIG. 13a. The coolant injector 311 is mounted in the combustion chamber head casting 332 with the outlet of the coolant injector located behind the intake valve 334. The arrangement shown in FIG. 13a is for a low pressure coolant injector and the timing and duration of the injection of the coolant into the combustion chamber is controlled by the computerized engine control module ECM 240. The embodiment shown in FIG. 13b is a modified low pressure liquid coolant arrangement wherein the low pressure coolant injector 311' injects the coolant into the combustion chamber to one side of the intake valve 334. In both the embodiments shown in FIGS. 13a and 13b, the injection is timed to occur when the intake valve is open. In the embodiment of FIG. 13c, a high pressure coolant injector 336 is mounted similar to the low pressure coolant injector 311' and the coolant injection is timed to take place prior to or during combustion when the intake valve 334 is closed. The direct injection of cooling liquid into the combustion chamber allows the engine to utilize complete combustion efficiency while protecting the engine from the extremely high temperatures generated by the complete combustion of vaporized fuel and oxygen. With the liquid coolant present at ignition and combustion, the liquid coolant absorbs the excess heat in vaporizing while providing extra combustion chamber head pressure.

A liquid coolant injection system is designed to use a variety of liquid coolants such as water, or water based mixtures of antifreeze and/or combustion chamber lubricants and/or anti-knock additives. Various types of antifreeze and the lubricating and anti-knock additives are well known in the art. Additional additives could also be added for specific purposes to modify the exhaust gas emissions for environmental reasons.

The operation of the system, according to the present invention, involves three distinct phases. The first phase involves the preheating, compression, heating and heating control of the intake air. The second phase involves liquid fuel injection into the glow plug vaporizing system for engine starting and liquid fuel injection into the vaporizer chamber for engine operation with resulting vapor fuel injection into the heated and pressurized intake air stream below the throttle plate. The third phase involves the ignition of the air/vapor fuel mixture within the combustion chamber and heat management provided by liquid coolant injection directly into the combustion chamber to assist in the control of exhaust gas temperatures and emissions.

The air is preheated as it is drawn over the radiator with a portion of the air being compressed by the compressor vanes 130 and 132 on the tips of the fan blades 36 travelling within a compressor housing 38. The compressed air is passed through a filter 136 into a heating chamber 150 where the air passes over and under the heating shell 68 which is heated by the exhaust gases from the engine. The pressure of the air is controlled by the relief valve RV 333 installed within the vaporizer housing. The temperature of the shell 68 is controlled by controlling the flow of the exhaust gases from the right hand exhaust manifold through the shell 68 by closing the exhaust gas valve EGV1 63 and opening the exhaust gas valve EGV2 65. The temperature of the shell is determined by the vaporizer heat shell temperature sensor VT 278 to determine when the vaporizer chamber hot plate 90 is hot enough to perform the vaporization of the fuel.

When the engine is cold, the glow plugs 110 and 112 are energized and liquid fuel is injected directly onto the heating elements of the glow plugs to instantly vaporize the fuel. The vaporized fuel from the glow plugs or from the vaporization chamber 84 is supplied through the passage 98 to the annular passage 100 in the annular member 102 which defines the inlet 104 for the intake manifold. The flow of heated pressurized air through the inlet passage 104 is controlled by the throttle plate 106 and the vaporized fuel is injected into the inlet passage 104 through the ports 108 for mixing with the heated pressurized air.

The air/fuel vapor mixture is then directed through the intake manifold to the individual combustion chambers for ignition and combustion in a manner similar to that of a conventional internal combustion engine. However, due to the extreme heat generated by the combustion of the air/fuel vapor mixture, the liquid coolant is sequentially injected directly into each combustion chamber adjacent the intake valve in a timed relation with the intake valve operation and the ignition of the air/fuel vapor mixture. The heat of combustion will vaporize the liquid coolant to lower the operating temperature within the combustion chamber and create additional pressure within the combustion chamber.

While the vaporized fuel injection system according to the present invention utilizes throttle body vapor fuel injection, (i.e. injection of vapor fuel directly under the throttle plate 106 into the intake manifold 58); multiport vapor fuel injection, (i.e. injection of vapor fuel downstream in the intake manifold immediately before the intake valve opening) and timed vapor fuel injection directly into the combustion chamber may be utilized as well.

This invention employs an on-board "dedicated" computer equipped with a "burned in" Programmable Read Only Memory (PROM) calibrated to meet the specific requirements of the engine, (i.e. a memory calibrated unit commonly referred to as the MEM-CAL Unit) an Electronic Spark Control (ESC) module and also contains some Random Access Memory (RAM). The above mentioned equipment is enclosed within a case, mounted aboard the vehicle and called the Electronic Engine Control Module or simply the ECM.

The purpose for using an Electronic Engine Control Module (ECM) is to achieve the best possible emission control while providing maximum fuel economy.

Figure 17:
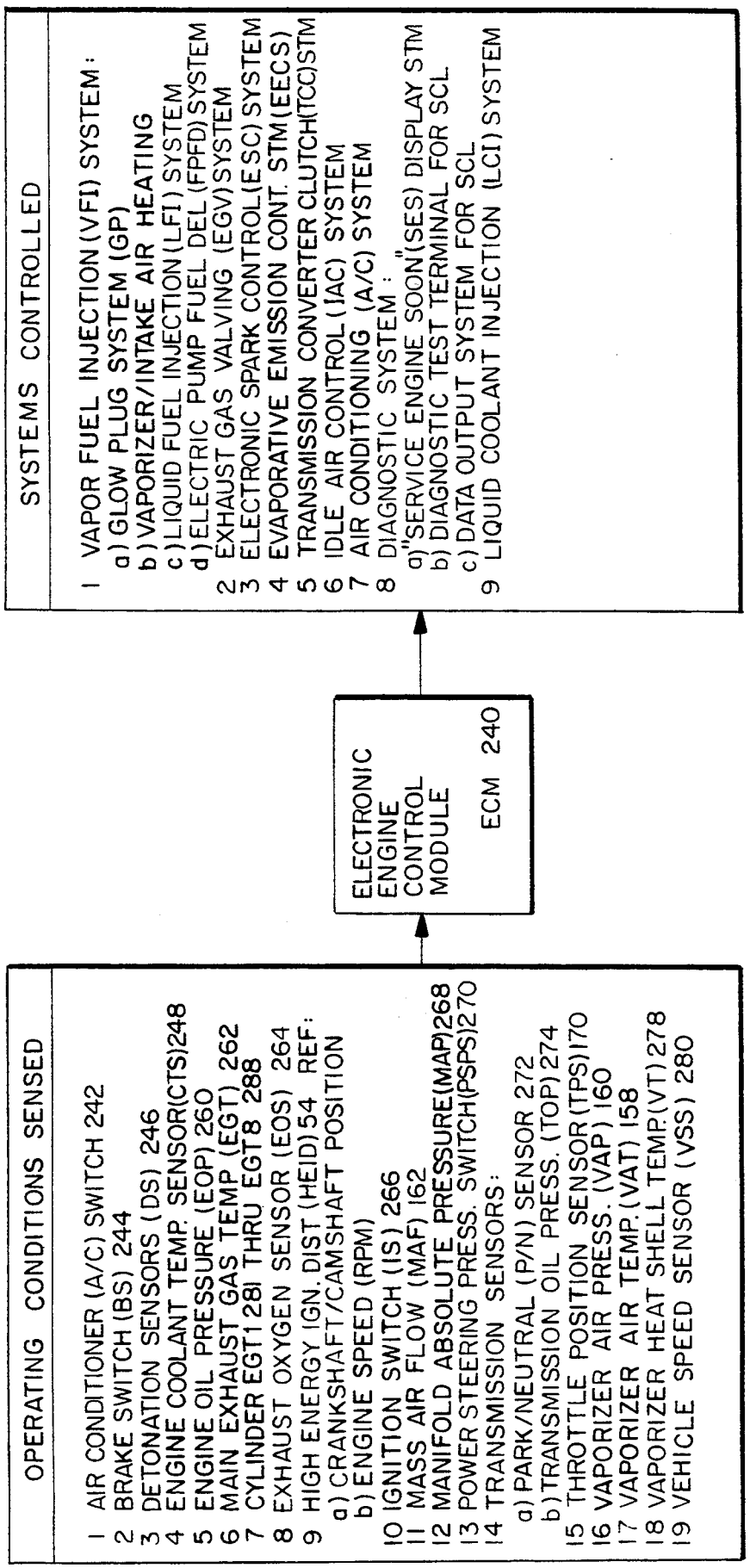
FIG. 17 is a schematic diagram of conditions sensed and controlled by the Electronic Engine Control Module (ECM).
Figure 18:
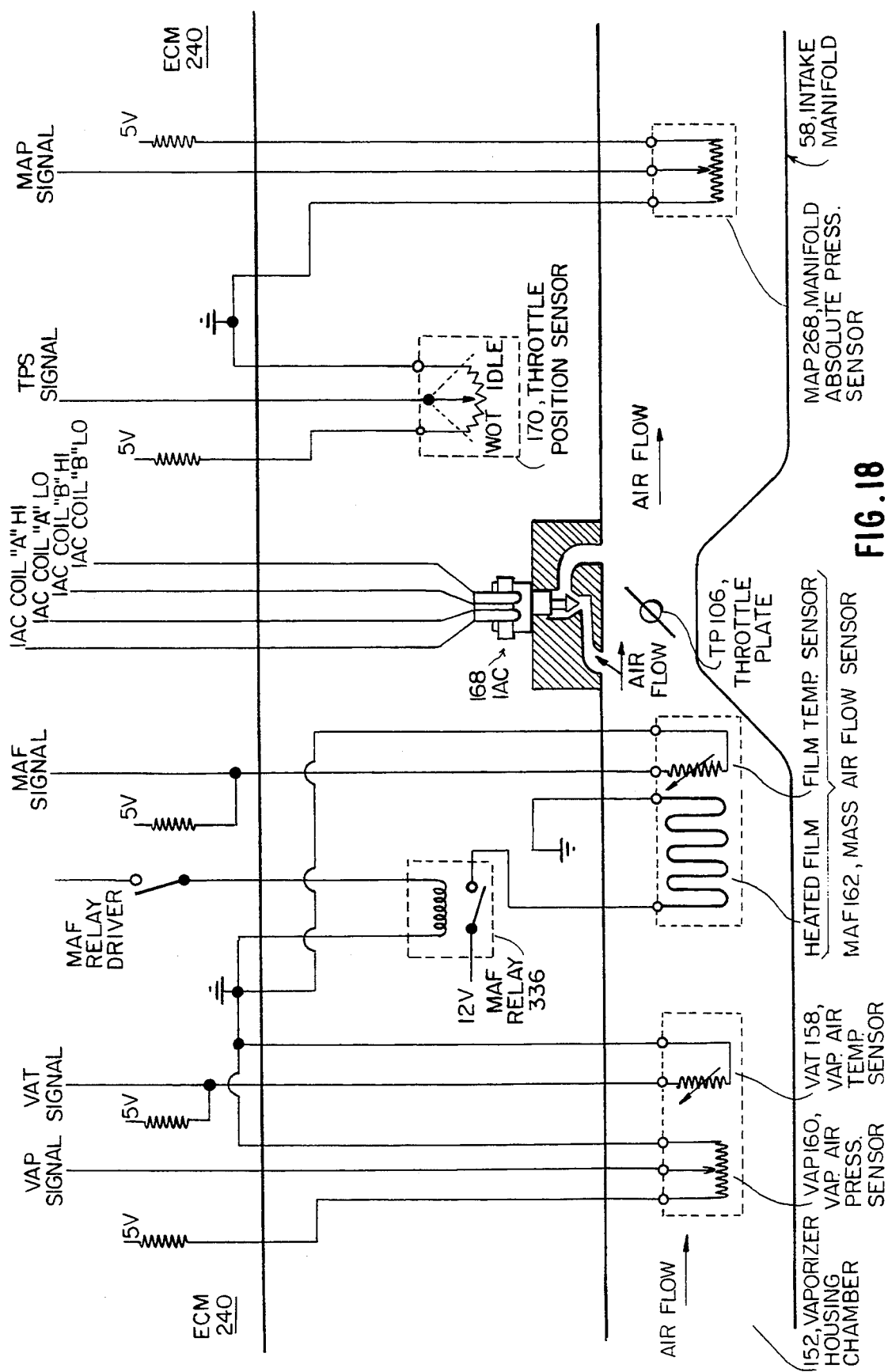
FIG. 18 is a schematic circuit diagram of intake air sensing and control.

The ECM 240 monitors a continual and ongoing feedback of informational data signals from its sensors and receives this data as "inputs". These inputs are compared, manipulated and calculated by the ECM and transformed into ECM commands or "outputs" which are sent to the various systems controlled by the ECM, FIG. 17. These outputs lack sufficient power to operate the systems directly; instead, they operate an intermediate device called a "driver" which in turn operates the appropriate control system.

The ECM performs a vital role in the vapor fuel injection system because mechanical or electromechanical control devices lack the precision and response necessary to meet the requirements of modern Federal Emission Control Standards. The ECM's importance and advantages will be apparent from the following more particular description as illustrated in FIG. 17 through FIG. 24.

As the heated and compressed intake air enters the Vaporizer Housing Chamber 152 (FIG. 18), the ECM 240 monitors the pressure and temperature with sensors VAP 160 and VAT 158, respectively. With pressure and temperature information of said air, the ECM more accurately measures the volume and mass of said air utilizing information sensed by the MAF 162 Sensor. The MAF 162 Sensor consists of a heated film and a resistor to measure the film temperature. The ECM maintains the film temperature 75° above that of the VAT 158 temperature and as more energy is required to maintain the higher film temperature, the ECM uses this difference in required energy to calculate the intake air mass. The ECM uses this as partial input information in calculating duration of fuel injection pulse and ESC timing.

The intake air flow is controlled at Inlet 104 by Throttle Valve Plate 106, the position of which is sensed by the Throttle Position Sensor (TPS) 170. The TPS 170 is an electrical potentiometer which provides a voltage signal that changes relative to TP 106 position. Signal voltage varies from low output at engine idle (closed throttle plate) to high output at Wide Open Throttle (WOT) plate. The TPS 170 signal is one of the most important voltage signal inputs used by the ECM 240 for Fuel Injector FI1 290 through FI5 298 (FIG. 20) Pulse Control.

The IAC Valve 168 is controlled by the ECM 240 and regulates the amount of bypass air around the throttle valve plate 106. With engine idling, the IAC Valve is open with respect to engine RPM. If engine RPM is low, the IAC Valve will open more and if engine RPM is high, the IAC Valve will move toward the closed position.

The MAP Sensor 268 senses changes in pressure within the intake manifold 58 below or beyond the throttle valve plate 106. While the VAP sensor 160 senses barometric and high pressures, the MAP 268 senses high vacuum (low pressure) at deceleration and engine idle conditions through to low or no vacuum (near or above barometric pressure) at wide to wide open throttle (WOT) conditions. The MAP sensor measures these pressure variations and converts that information into an electrical voltage output. The ECM 240 receives this signal voltage information as a low voltage output during deceleration with a closed throttle plate 106 increasing voltage output somewhat at idle conditions and a high voltage output at wide open throttle conditions. Before the engine is started, the MAP sensor senses the true ambient air barometric pressure and should coincide with that of the VAP sensor. By monitoring the MAP sensor as well as the VAP sensor, the ECM is capable of precise fuel injector commands to ensure proper air/vapor fuel ratios for any given engine operating condition.

Figure 19:
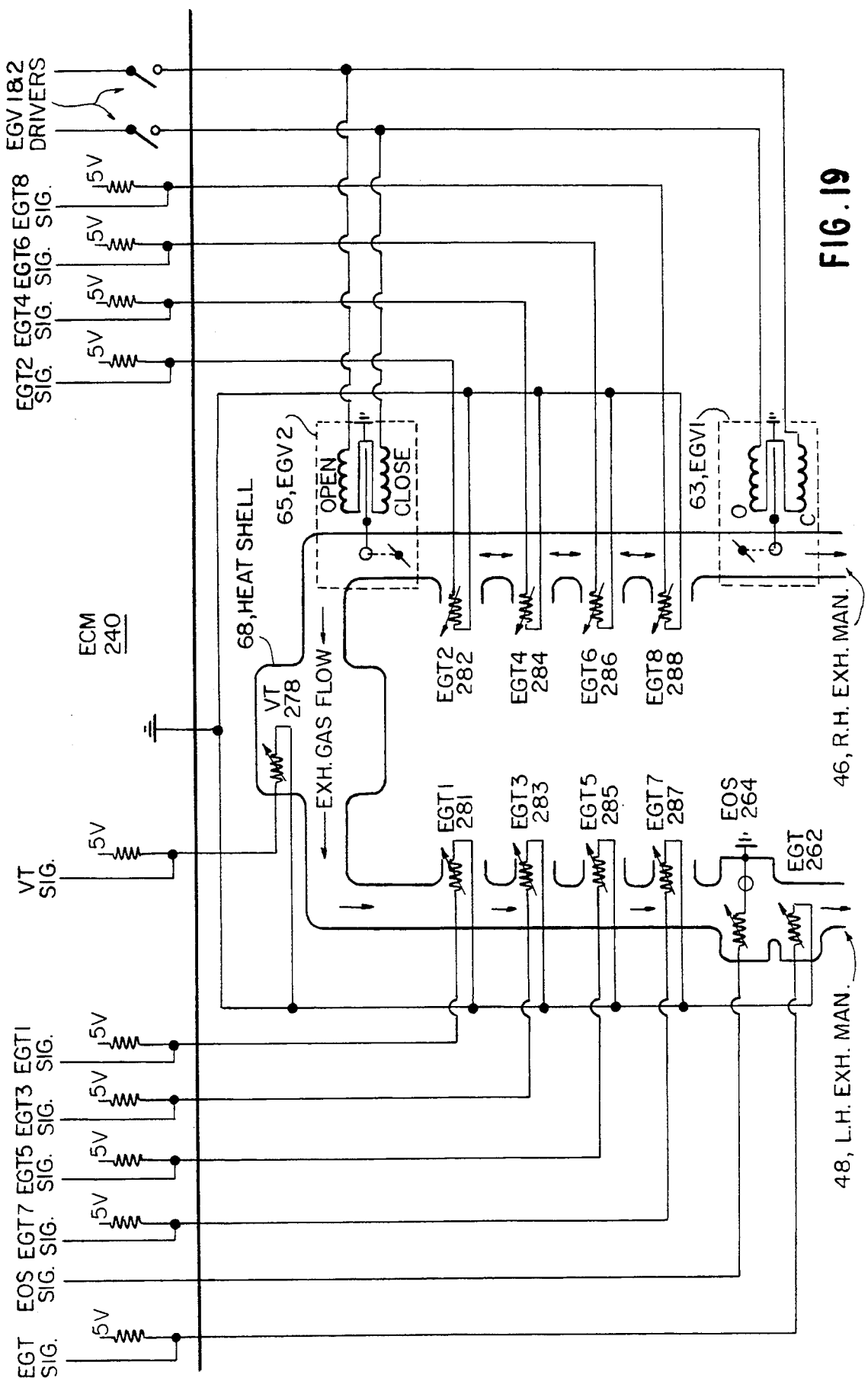
FIG. 19 is a schematic circuit diagram of exhaust gas sensing and control.
Figure 20:
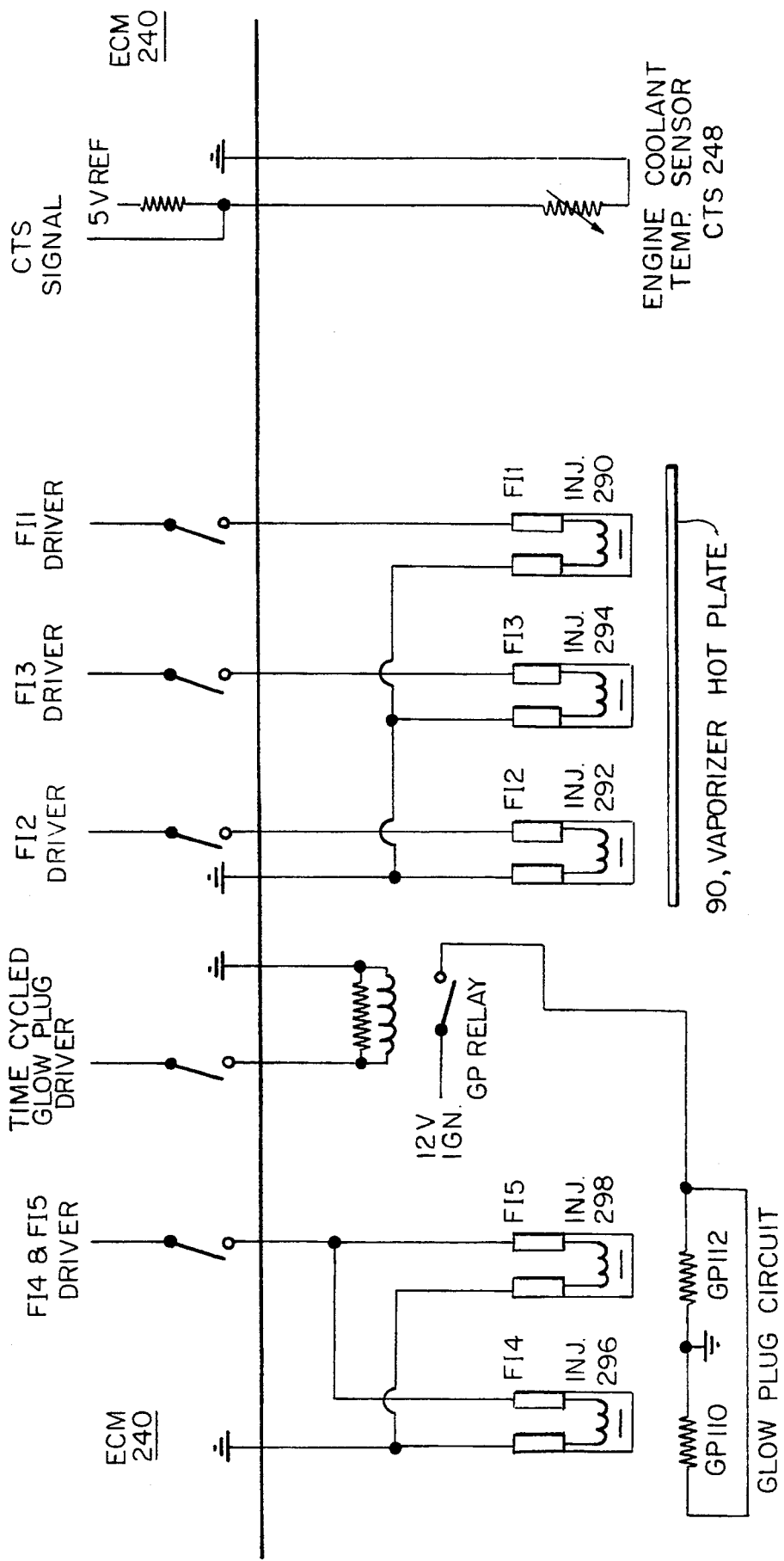
FIG. 20 is a schematic circuit diagram of liquid fuel injection and glow plug control along with engine coolant temperature sensing.

With cold engine start-up and exhaust gas flow, FIG. 19, EGV1 63 closes and EGV2 65 opens exposing Heat Shell 68, Vaporizer Hot Plate 90 and VT Sensor 278 to hot exhaust gas flow. The ECM 240 uses VT 278 information to control the Glow Plug Circuit (FIG. 20), (i.e. low VT=GP110 and GP112 "on" while high VT=GP110 and GP112 "off"). The ECM uses VAT 158 (FIG. 18) information to control EGV1 63 and EGV2 65 in order to maintain calibrated intake air temperature during all climatic conditions.

The EOS 264 reacts with exhaust gas oxygen to produce a voltage output; i.e. a low voltage output = high oxygen content with a fuel lean hot burning mixture while a high voltage output = low oxygen content with a fuel rich cool burning mixture. The ECM 240 monitors the EOS 264 signal in order to maintain an optimum high oxygen content/fuel lean hot burning mixture.

Figure 21:
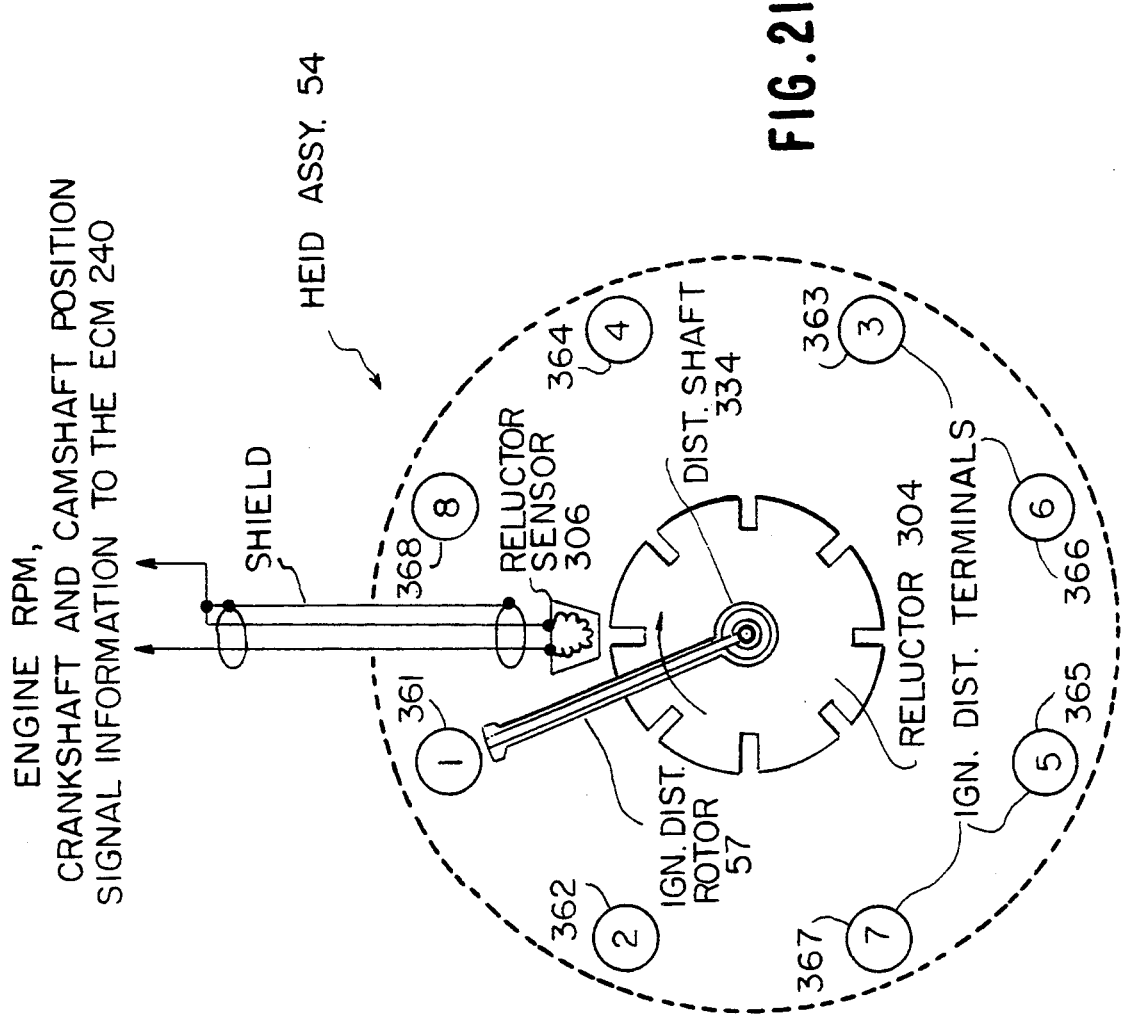
FIG. 21 is a schematic and sectional view taken along the line 21—21 of FIG. 4.
Figure 21A:
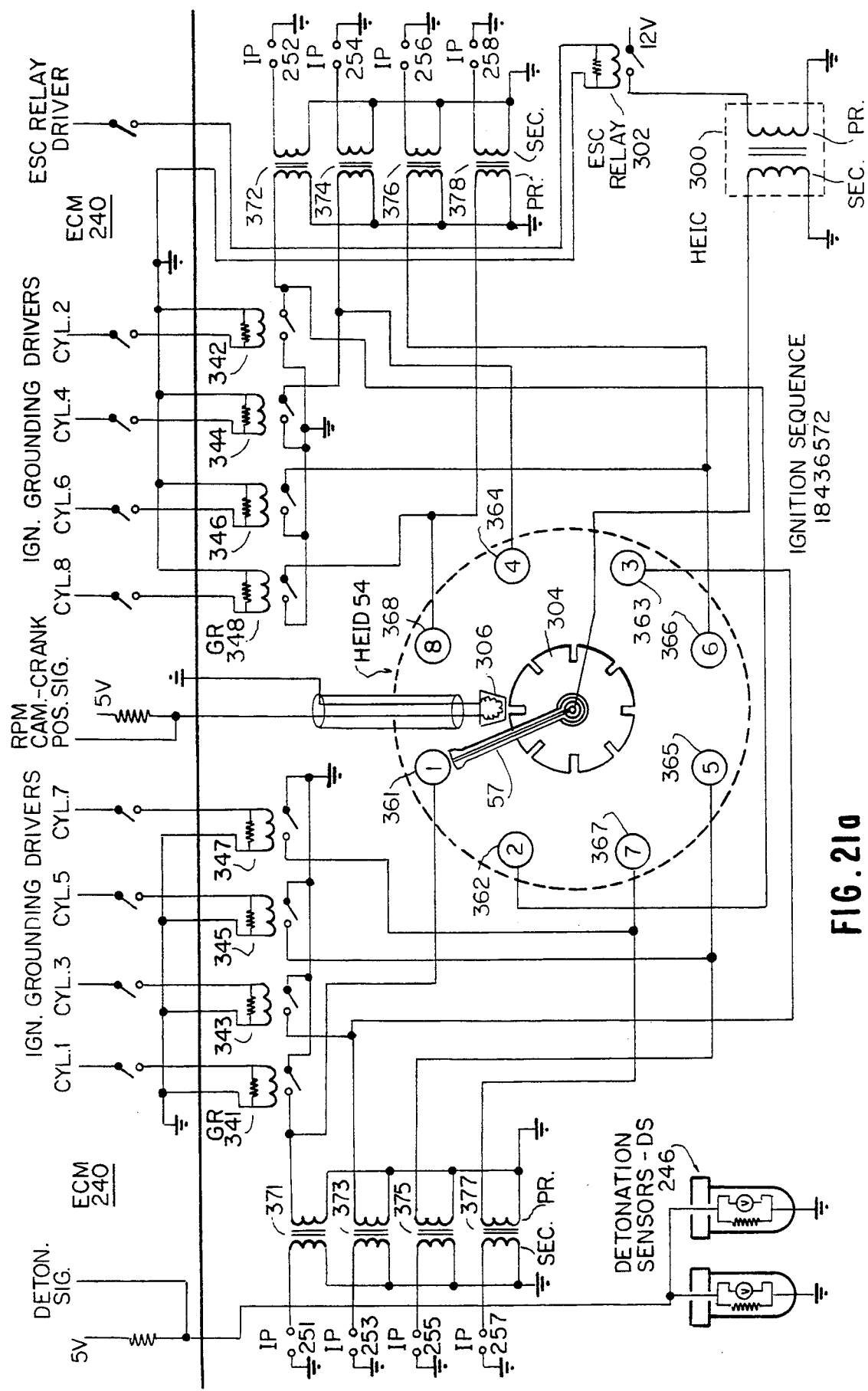
FIG. 21a is a schematic circuit diagram of electronic spark control, ignition voltage amplification, and individual combustion chamber ignition control along with detonation, engine RPM and crank/camshaft position sensing.

The EGT 262 sensor signal is monitored by the ECM 240 which will command liquid coolant injection via coolant injectors CI1 311 through CI8 318 (FIG. 23) when exhaust gas temperature rises above calibrated limits. Sensors EGT1 281 through EGT8 288 (FIG. 19) are monitored by the ECM for prolonged above calibrated exhaust temperatures (which would indicate a malfunctioning coolant injector) and ground the ignition to that particular cylinder (FIG. 21a) thus preventing cylinder heat damage. The "Service Engine Soon" Light SES 332 (FIG. 24) would also be energized at this time.

The CTS 248 (FIG. 20) signal is monitored by the ECM 240 to insure the engine operates within calibrated temperature limits. CTS 248 information is used to calculate fuel injector pulse duration, ESC timing along with torque converter clutch and idle air control.

The Electronic Spark Control (ESC) with detonation sensing (FIG. 21a) is of a conventional nature; however, combine same with an ignition control system providing individual combustion chamber ignition control along with timed liquid coolant injection means and a new and improved electronic spark control system evolves. As mentioned previous, the ECM 240 monitors EGT1 281 through EGT8 288 sensors for higher than calibrated exhaust gas temperatures and grounds the ignition via Grounding Relays (GR) 341 through 348 to any combustion chamber producing the higher temperature. The ECM monitors Detonation Sensors (DS) 246 and sensing detonation, the ECM delays or "retards" the spark command to ESC Relay 302 which controls the HEIC 300. The 12 volt input to the primary windings of HEIC 300 is amplified in a conventional manner to standard secondary winding voltage output; however, said secondary voltage output lacks sufficient electrical potential to provide reliable ignition when used with wide-gap or rail-type ignition plugs. This problem is addressed by maintaining the standard secondary voltage output of HEIC 300 (FIG. 21a) to the Ignition Distributor Rotor 57 rotated by Distributor Shaft 334 thus distributing said secondary voltage output via Ignition Distributor Terminals 361 through 368 to the primary windings of Coil Assemblies 371 through 378. The secondary voltage output of HEIC 300 into Coil Assemblies 371 through 378 primary windings is thus amplified by the secondary windings of said coil assemblies for distribution to Ignition Plugs (IP) 251 through 258. Coil Assemblies 371 through 378 are disposed in close proximity respectively to Ignition Plugs 251 through 258 in order to control the higher voltage potential. The ECM monitors engine RPM via Reluctor Sensor 306 sensing Reluctor 304 rotation by Shaft 334.

Figure 22:
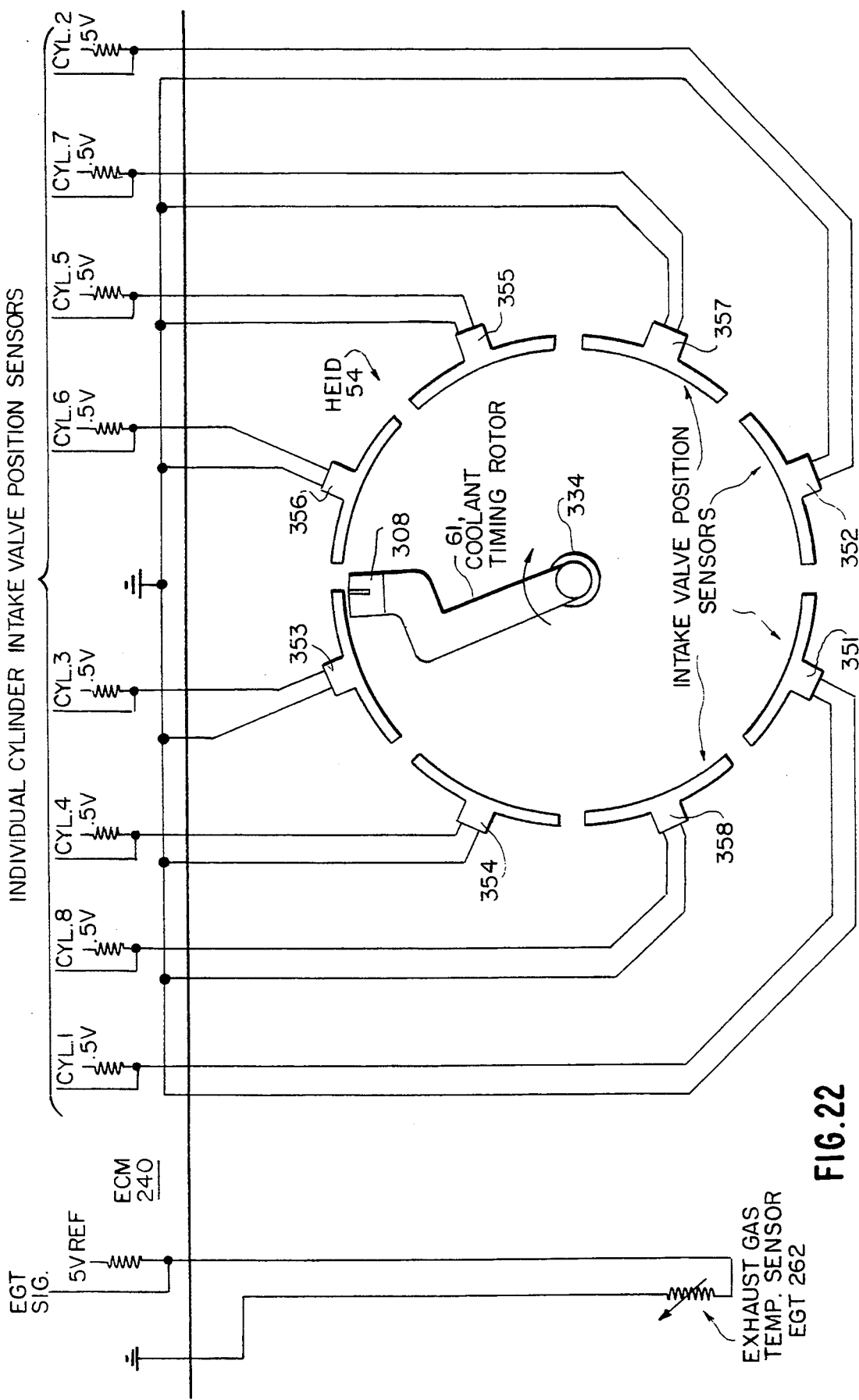
FIG. 22 is a schematic circuit diagram of individual intake valve position sensing along with main exhaust gas temperature sensing.
Figure 23:
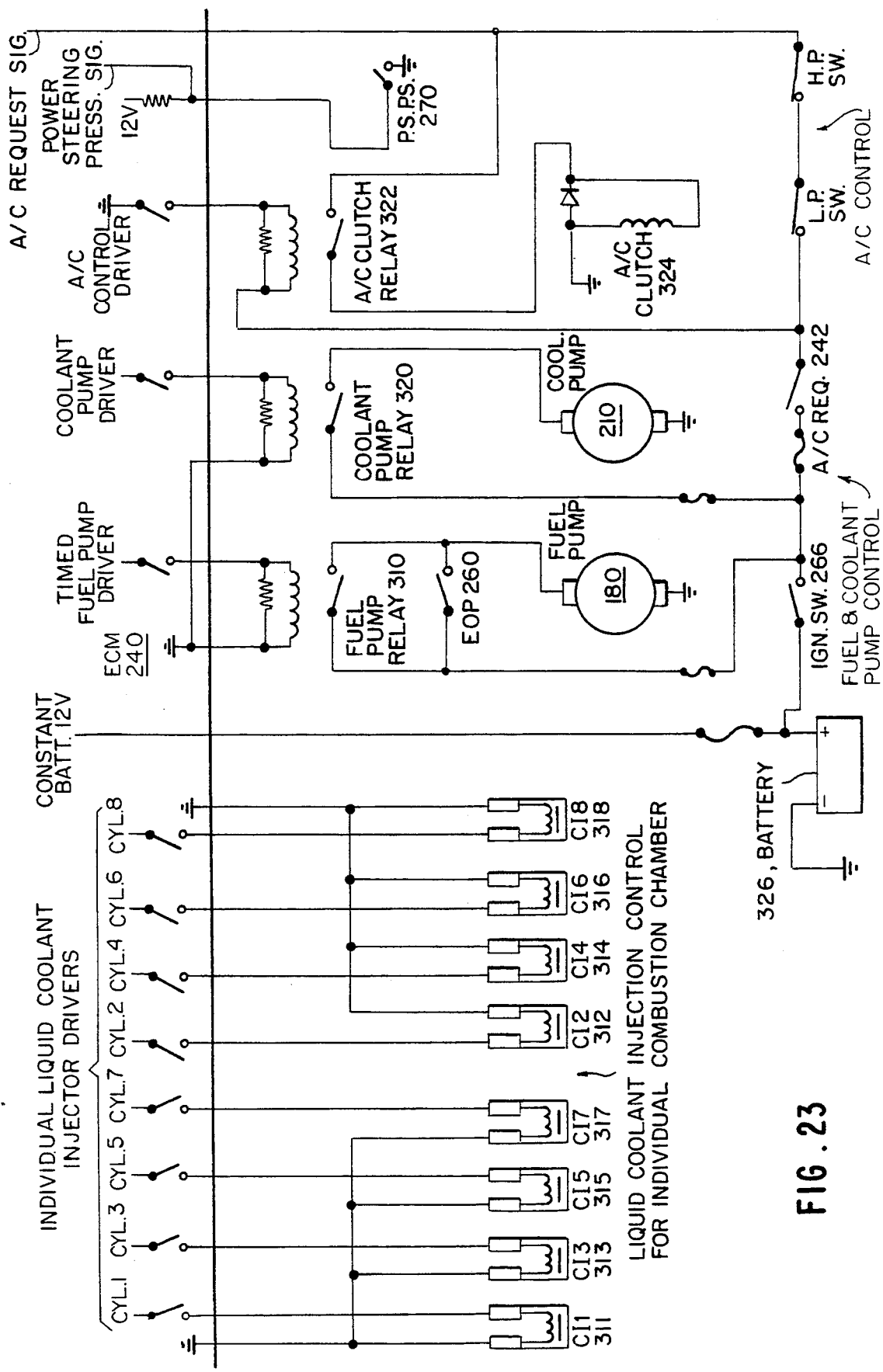
FIG. 23 is a schematic circuit diagram of liquid coolant injection control, fuel and coolant pumping control and air conditioning control.
Figure 24:
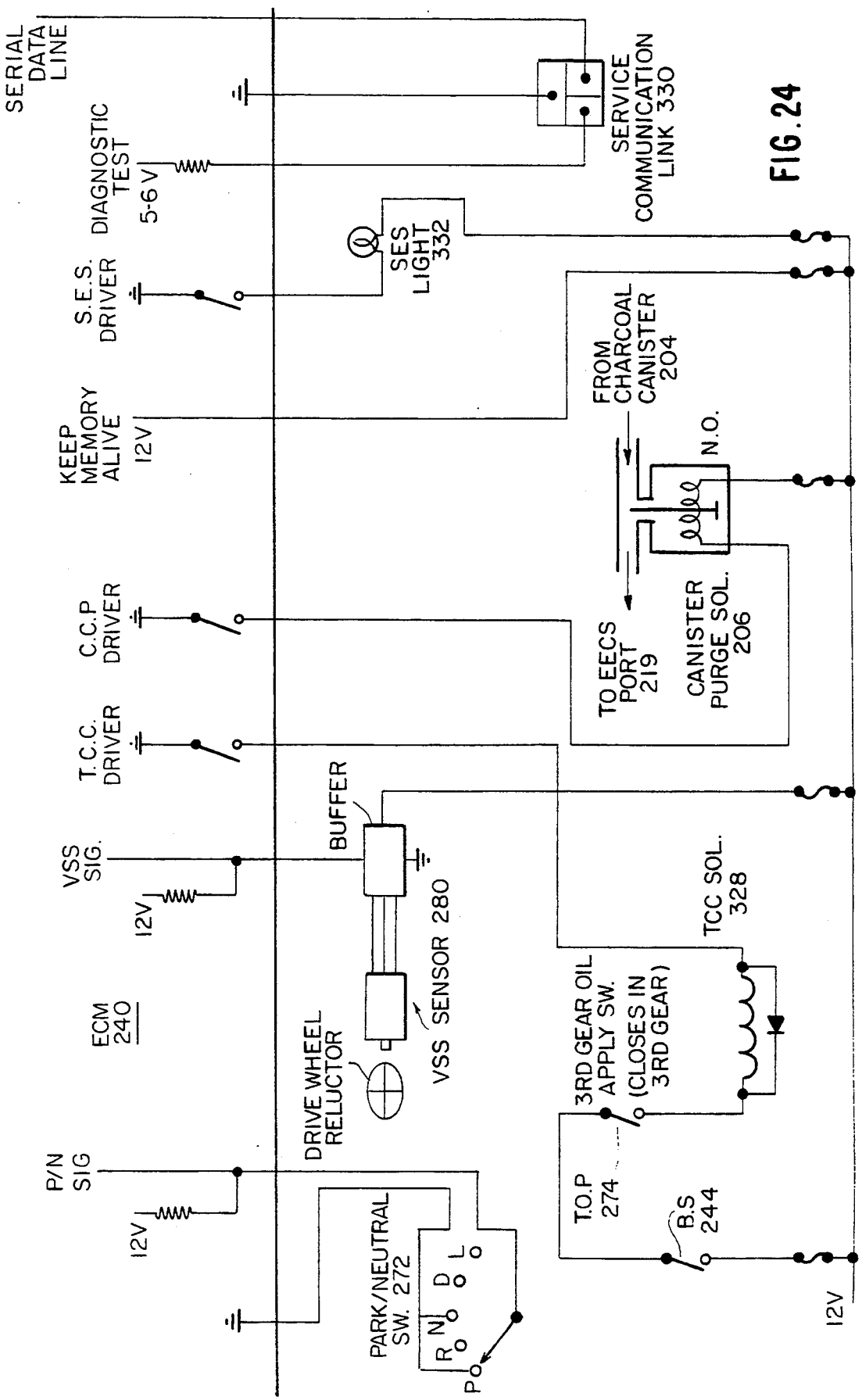
FIG. 24 is a schematic circuit diagram of P/N, VSS, TCC, CCP, SES sensing and control along with the diagnostic service communication system.

The HEID Assembly 54 also senses intake valve position for the injection of liquid coolant directly into the Combustion Chamber (FIG. 22). A permanent magnet 308 is mounted on the end of the Coolant Timing Rotor 61 which is rotated with respect to camshaft position by Shaft 334. As the magnet is rotated past the Intake Valve Position Sensors 351 through 358, the ECM senses a voltage differential thus indicating the intake valve for that particular combustion chamber is open and available for liquid coolant injection if called for VIA EGT 262 Sensor Signal. The ECM 240 continually monitors EGT1 281 through EGT8 288 (FIG. 19) for higher than calibrated exhaust gas temperatures and sensing same will activate the appropriate Ignition Grounding Relay GR 341 through GR 348 (FIG. 21a) grounding the ignition to the combustion chamber producing the higher temperature. The Coolant Timing Rotor 61, the Ignition Distributor Rotor 57 and the Reluctor 304 are all disposed on Distributor Shaft 334 and rotate in common. Shaft 334 is rotated by the engine camshaft which is rotated by the Engine Output Shaft 24; in this manner, electronic spark timing and liquid coolant injection timing is accomplished. FIG. 16b shows the angular rotation in degrees of the Distributor Shaft 334 with respect to the engine output shaft 24 rotation. Using cylinder number one (CYL 1) only as an example, consider the crankshaft position as being top dead center (TDC) or "0" degrees rotation with the Ignition Distributor Rotor 57 pointing at Ignition Terminal 361 and the Coolant Timing Rotor 61 ending its sensing of Sensor 353. As Ignition Plug 251 fires and starts Cylinder 1 power stroke, Rotor 57 and Rotor 61 rotates in the direction of arrow on Reluctor 304 90° to the end of CYL 1 power stroke. Both said rotors 57 and 61 rotate an additional 90° more which represents the exhaust stroke of CYL 1. At the end of said 180° rotor rotation and at the beginning of 181° rotor rotation through 270° rotation, the intake valve for CYL 1 opens and closes respectively. The 61 coolant timing rotor's permanent magnet 308 rotates in close proximity of Intake Valve Position Sensor 351 for the wide open portion of CYL 1 intake valve position. The ECM 240 monitors said rotation and will pulse liquid coolant injector 311 accordingly if called upon to do so by a signal from EGT 262. Liquid coolant injection directly into each combustion chamber is achieved in said manner (FIG. 23).

The Electric Pump Coolant Delivery EPCD System is EMC controlled and is energized when the EGT 262 Sensor approaches the coolant injection lower calibrated temperature limit.

The Electric Pump Fuel Delivery System (EPFD), the Air Conditioning (A/C) control system (FIG. 24) along with the Park/Neutral (P/N), Vehicle Speed Sensor (VSS), the EECS and the ECM Service Communication Link (FIG. 24) are well known in the art; however, any system associated with the output of an internal combustion engine must be calculated in the engine's input, i.e. the fuel system for that particular engine.

While the invention has been particularly shown and described with reference to preferred embodiments thereof, it will be understood by those in the art that the foregoing and other changes in form and details may be made therein without departing from the spirit and scope of the invention.

What is claimed is:

1. A vaporized fuel injection system for an internal combustion engine having at least one combustion chamber, said injector system comprising housing means;

first passage means extending through said housing means and having inlet and outlet means for connection to an exhaust manifold system of an internal combustion engine for circulation of exhaust gases through said first passage means;

second passage means extending through said housing means in contact with said first passage means, said second passage means having inlet means and outlet means;

air compressor means connected to said inlet means for said second passage means for supplying pressurized air through said second passage means for heating said pressurized air;

throttle means mounted in said outlet means of said second passage means for controlling pressurized air flow through said outlet means of said second passage means;

partition means defining a fuel vaporization chamber having a plate in common with said first passage means;

fuel injection means for injecting liquid fuel directly onto said plate which is heated by passage of exhaust gases through said first passage means to generate vaporized fuel; and distribution means connected to said chamber and said outlet means of said second passage means for distributing vaporized fuel and heated pressurized air to said at least one combustion chamber.

2. A vaporized fuel injection system as set forth in claim 1, further comprising:

third passage means disposed in communication with said fuel vaporization chamber;

glow plug means mounted in said third passage means; and additional fuel injection means for injecting liquid fuel directly onto said glow plug means to generate vaporized fuel when said engine is cold.

3. A vaporized fuel injection system as set forth in claim 2, wherein said distribution means includes fourth passage means connected between said vaporization chamber, said third passage means and said outlet means of said second passage means downstream of said throttle means for supplying vaporized fuel for mixing with said heated pressurized air prior to combustion within said combustion chamber.

4. A vaporized fuel injection system as set forth in claim 3, wherein said outlet means for said second passage means is comprised of an annular body having a central through passage in which said throttle means is pivotally mounted;

an annular ring passage located in said annular body in communication with said fourth passage means; and a plurality of ports disposed circumferentially about said annular body communicating said annular passage with said through passage for the passage of fuel vapors into the pressurized air downstream of said throttle means.

5. A vaporized fuel injection system as set forth in claim 1, further comprising radiator means connected to said internal combustion engine and wherein said air compressor means is comprised of fan means operatively driven by said internal combustion engine disposed between said radiator means and said internal combustion engine, said fan means having a plurality of radially extending blades with compressor vanes mounted at a radially outermost end of each blade, and compressor housing means substantially surrounding said compressor vane means and providing a compressed air chamber in communication with said inlet means of said second passage means, whereby upon rotation of said fan means, air will be preheated by passage over said radiator means and compressed by said compressor vane means and delivered to said second passage means.

6. An internal combustion engine having at least one combustion chamber with ignition means;

a vaporized fuel injection system for supplying a mixture consisting essentially of air and vaporized fuel to said combustion chamber;

valve means controlling the flow of said air and vaporized fuel into said combustion chamber; and liquid coolant injector means mounted adjacent said valve means for injecting liquid coolant into said combustion chamber with said air and vaporized fuel for controlling temperature within said combustion chamber upon combustion of said air and vaporized fuel.

7. An internal combustion engine as set forth in claim 6, further comprising:

power supply means;

distribution means connecting said power supply means and said ignition means;

temperature sensing means associated with said at least one combustion chamber to sense combustion temperature therein; and ignition control means connected to said distribution means for disabling said ignition means for said one combustion chamber in response to a signal provided by said temperature sensing means upon sensing an excessive combustion temperature to prevent operation of said ignition means of said one combustion chamber.

8. An internal combustion engine as set forth in claim 7, wherein said internal combustion engine is provided with a plurality of combustion chambers, each having ignition means and liquid coolant injection means and distributor means having a plurality of contacts for controlling each ignition means and a plurality of contacts for controlling each liquid coolant injection means and rotor means engaging said contacts for controlling the sequencing of operation of said liquid coolant injection means and said ignition means and wherein said ignition control means is provided for each ignition means to prevent operation thereof in response to excessive combustion temperature due to malfunction of a respective liquid coolant injection means.

9. An internal combustion engine as set forth in claim 6, further comprising radiator means connected to said engine fan means operatively driven by said internal combustion engine disposed between said radiator means and said internal combustion engine, said fan means having a plurality of radially extending blades with compressor vanes mounted at a radially outermost end of each blade, compressor means comprising compressor housing means substantially surrounding said compressor vane means and providing a compressed air chamber, whereby upon rotation of said fan means, air will be compressed by said compressor vane means and delivered to said compressed air chamber and means connecting said compressed air chamber to said vaporized fuel injection system.

10. An internal combustion engine as set forth in claim 9, further comprising heavy particle collector means disposed in communication with said compressor means adjacent an outer periphery thereof for receiving and trapping heavy particles of dirt and the like.

11. An ignition system for an internal combustion engine having at least one combustion chamber comprising:

power supply means;

at least one ignition means operatively associated with said at least one combustion chamber;

distribution means connecting said power supply means and said at least one ignition means;

temperature sensing means associated with said at least one combustion chamber to sense combustion temperature therein; and ignition control means connected to said distribution means for disabling said ignition means in response to a signal provided by said temperature sensing means upon sensing an excessive combustion temperature to prevent operation of said ignition means.

12. An ignition system as set forth in claim 11, wherein said combustion engine has a plurality of combustion chambers each having respective ignition means and temperature sensing means and wherein said distribution means includes distributor means for sequentially supplying power to said ignition means associated with each combustion chamber, said ignition control means being operative to prevent operation of a respective ignition means when a temperature sensing means associated therewith senses excessive combustion temperature.

13. An ignition system as set forth in claim 12, further comprising first transformer means operatively connected between said power supply means and said distributor means and a plurality of second transformer means connected between said distributor means and each respective ignition means.

* * * * *